United States Patent
Fugman et al.

(10) Patent No.: US 9,294,620 B2
(45) Date of Patent: Mar. 22, 2016

(54) METHOD, MEDIUM, AND SYSTEM FOR A CUSTOMER SERVICE APPLICATION FOR A PORTABLE ELECTRONIC DEVICE

(75) Inventors: Corey Fugman, San Jose, CA (US); Benjamin Vigier, San Francisco, CA (US); Yingfeng Su, Santa Clara, CA (US); Chen Li, San Jose, CA (US); Filip Krsmanovic, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 773 days.

(21) Appl. No.: 13/476,765

(22) Filed: May 21, 2012

(65) Prior Publication Data

US 2012/0296686 A1 Nov. 22, 2012

Related U.S. Application Data

(60) Provisional application No. 61/488,698, filed on May 20, 2011.

(51) Int. Cl.
*G06Q 30/00* (2012.01)
*H04M 3/487* (2006.01)
(Continued)

(52) U.S. Cl.
CPC ......... *H04M 3/4872* (2013.01); *G06Q 30/0613* (2013.01); *H04M 3/42348* (2013.01); *H04M 3/523* (2013.01); *H04M 3/4878* (2013.01);
(Continued)

(58) Field of Classification Search
CPC .......... G06Q 30/0259; G06Q 30/0261; H04W 4/022; H04W 4/021; H04W 68/04; G01S 5/12
USPC ................... 705/1, 14.57, 14.58, 14.63, 26.9; 701/426, 438; 455/456.1
See application file for complete search history.

(56) References Cited

U.S. PATENT DOCUMENTS

| | | | | |
|---|---|---|---|---|
| 6,922,674 B1 * | 7/2005 | Nelson | ................. | G06Q 20/203 705/22 |
| 7,930,211 B2 * | 4/2011 | Crolley | ................. | G06Q 30/02 370/254 |

(Continued)

FOREIGN PATENT DOCUMENTS

| | | |
|---|---|---|
| DE | 10049825 | 5/2002 |
| EP | 1557807 | 7/2005 |

(Continued)

OTHER PUBLICATIONS

May 2010—http://static.googleusercontent.com/media/www.google.com/en/us/intl/zh-CN/events/facultysummit/2010/files/mobile_location.pdf.*

(Continued)

*Primary Examiner* — Matthew Zimmerman
(74) *Attorney, Agent, or Firm* — Novak Druce Connolly Bove + Quigg LLP

(57) ABSTRACT

A customer service application resident on a user's portable electronic device is used to get information about a service and also request the service offered by a store. The customer service application can check for nearby stores when launched. Once the user is deemed to be within the service area of the store, the store host server computer can start sending information about various products, servers, events, or workshops offered by the store. The user can use the customer service application to request product or service help from store employees, register for an event/workshop, reserve a product for pickup, etc.

21 Claims, 24 Drawing Sheets

(51) Int. Cl.
*H04M 3/42* (2006.01)
*H04M 3/523* (2006.01)
*G06Q 30/06* (2012.01)
*H04W 4/02* (2009.01)

(52) U.S. Cl.
CPC ... *H04M2203/2094* (2013.01); *H04M 2242/30* (2013.01); *H04W 4/02* (2013.01)

(56) References Cited

U.S. PATENT DOCUMENTS

| | | | | |
|---|---|---|---|---|
| 8,005,731 | B1* | 8/2011 | Wolfe | G06Q 30/0609 705/35 |
| 2003/0004743 | A1* | 1/2003 | Callegari | G06F 17/30241 705/1.1 |
| 2003/0004802 | A1* | 1/2003 | Callegari | G06F 17/30241 705/14.13 |
| 2004/0203878 | A1* | 10/2004 | Thomson | G06Q 10/06311 455/456.1 |
| 2005/0256782 | A1* | 11/2005 | Sands | G06Q 10/087 705/26.41 |
| 2007/0138268 | A1* | 6/2007 | Tuchman | G06Q 30/02 235/383 |
| 2008/0225810 | A1* | 9/2008 | Buchwald | H04W 4/02 370/338 |
| 2010/0279706 | A1* | 11/2010 | Dicke | H04M 1/72572 455/456.1 |

FOREIGN PATENT DOCUMENTS

| | | |
|---|---|---|
| GB | 2363943 | 1/2002 |
| JP | 2002-109195 | 4/2002 |
| JP | 2008-262362 | 10/2008 |
| JP | 2009-129002 | 6/2009 |
| TW | 200907836 | 2/2009 |

OTHER PUBLICATIONS

Fugman, Corey et al., "Customer Service Application for a Portable Electronic Device", Examiners First Report, Application No. 2012202960, filed May 21, 2012, 6 pages, dated Jul. 29, 2013.

Fugman, Corey et al., "Customer Service Application for a Portable Electronic Device", Application No. DE 10 2012 208 329.4, filed May 18, 2012, Official Action, dated Jan. 25, 2013, Published Nov. 22, 2012, 50 pages.

Fugman, Corey et al., "Customer Service Application for a Portable Electronic Device", Official Action, 8802.243.NPJP00, Application No. 2012-128370, filed May 18, 2012, dated Jul. 10, 2013, Published Dec. 10, 2012, 19 pages.

Krumm, John, "Ubiquitous Advertising the Killer Application for the 21st Century", Researcher at Microsoft Research, Redmond Washington, www.computer.org/pervasive, Jan.-Mar. 2011, pp. 66-73.

Application No. PCT/US2012/038885, International Search Report and Written Opinion, 49 pages, dated Oct. 9, 2012.

Application No. 1208855.5, Combined Search and Examination Report under Section 17 and 18 (3), 15 pages, dated Sep. 15, 2012.

* cited by examiner

METHOD, MEDIUM, AND SYSTEM FOR A CUSTOMER SERVICE APPLICATION FOR A PORTABLE ELECTRONIC DEVICE

CROSS-REFERENCES TO RELATED APPLICATIONS

This application claims benefit under 35 USC §119(e) to U.S. Provisional Patent Application No. 61/488,698 filed May 20, 2011, the disclosure of which is incorporated by reference herein in its entirety for all purposes.

This application is related to U.S. Provisional Application No. 61/554,908, filed on Nov. 2, 2011.

BACKGROUND

In order for any merchant to be successful, providing excellent customer service is considered a must in today's competitive environment. Merchants who own or operate a retail establishment have additional challenges when it comes to providing customer service. A common consumer, e.g. an individual, who often visits such retail establishment, is not usually as sophisticated as a corporate customer. The common consumer usually needs extra help in understanding various features of a product that he/she is interested in. Often, interaction with a knowledgeable salesperson can make a huge difference in whether the consumer purchases a product or not.

Traditionally, retail establishments hire salespersons that are available at a retail location to help consumers and answer their questions. However; often either there are too few sales people available or the ones available may not have the necessary product knowledge that the consumer is looking for. In many instances, finding a salesperson at a retail establishment itself can take a long time. In such instances, the consumer is likely to lose interest and walk out of the retail establishment without purchasing the product resulting in loss of business to the establishment.

SUMMARY

Embodiments of the present invention are generally related to techniques for providing customer service. Specifically, some embodiments of the present invention provide a customer service application that is resident on a user's portable electronic device that can be used for accessing information about products and services available at a particular retail establishment or store.

Some embodiments of the present invention provide a method for determining when a user is within a predetermined distance or within a service area of a store and automatically providing information about the products, services, or events offered by the store to the user via the customer service application on his/her mobile device. In addition, the user can use the customer service application to manage his interaction with the store and its employees.

Other embodiments of the present invention provide techniques that can help the user keep abreast of his previous and/or ongoing interactions with the store or store personnel even after the user walks out of the store and is farther away from a predetermined distance from the store.

The following detailed description together with the accompanying drawings will provide a better understanding of the nature and advantages of the present invention.

DETAILED DESCRIPTION

Embodiments of the present invention are generally related to a portable electronic device. More specifically, some embodiments of the present invention provides an interactive customer service application that enables a user to browse product information for products displayed in a retail store, request assistance from store personnel, and in some instances buy the desired product.

Some embodiments of the present invention provide a portable electronic device that includes the customer service application. The mobile device tracks the position of the user and when it determines that the user is within a predetermined distance of a retail store, the portable electronic device automatically launches the customer service application to inform the user that he/she is near a retails store and displays information about products and services available in that retail store.

Figure 1:
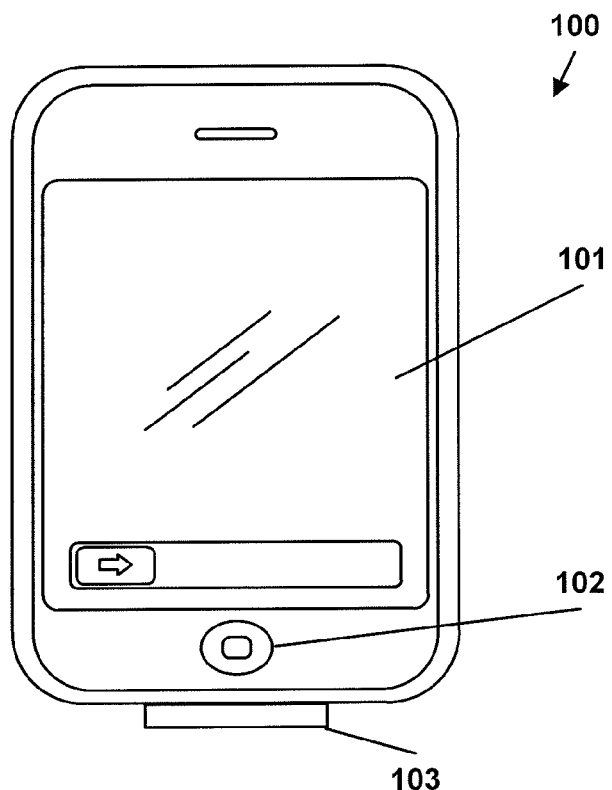
FIG. 1 illustrates a mobile device according to an embodiment of the present invention.

FIG. 1 illustrates a portable electronic device 100 including a customer service application according to an embodiment of the present invention. Portable electronic device 100 can include any suitable type of electronic device. For example, portable electronic device 100 can include an electronic device that the user may hold in his or her hand, such as a digital media player (e.g., an iPod™ made available by Apple Inc. of Cupertino, Calif.), a personal e-mail device (e.g., a Blackberry™ made available by Research in Motion of Waterloo, Ontario), a personal data assistant ("PDA"), a cellular telephone (e.g., an iPhone™ made available by Apple Inc. of Cupertino, Calif.), a handheld gaming device, a tablet computer, or a digital camera. As another example, portable electronic device 100 can include a larger portable electronic device, such as a laptop computer.

Portable electronic device (PED) 100 can include a screen 101, a button 102, and a connector 103, among other features. Screen 101 can be a touch screen that includes a tactile interface. A user can interact with PED 100 via a user interface (not shown) and screen 101. Button 102 can be used to return PED 100 to its "home" state. Connector 103 can be a multi-pin connector capable of connecting to external devices/accessories, e.g., a charger, a dock, etc. In some embodiments, connector 103 can be configured to mate with a corresponding connector on an accessory.

Figure 2:
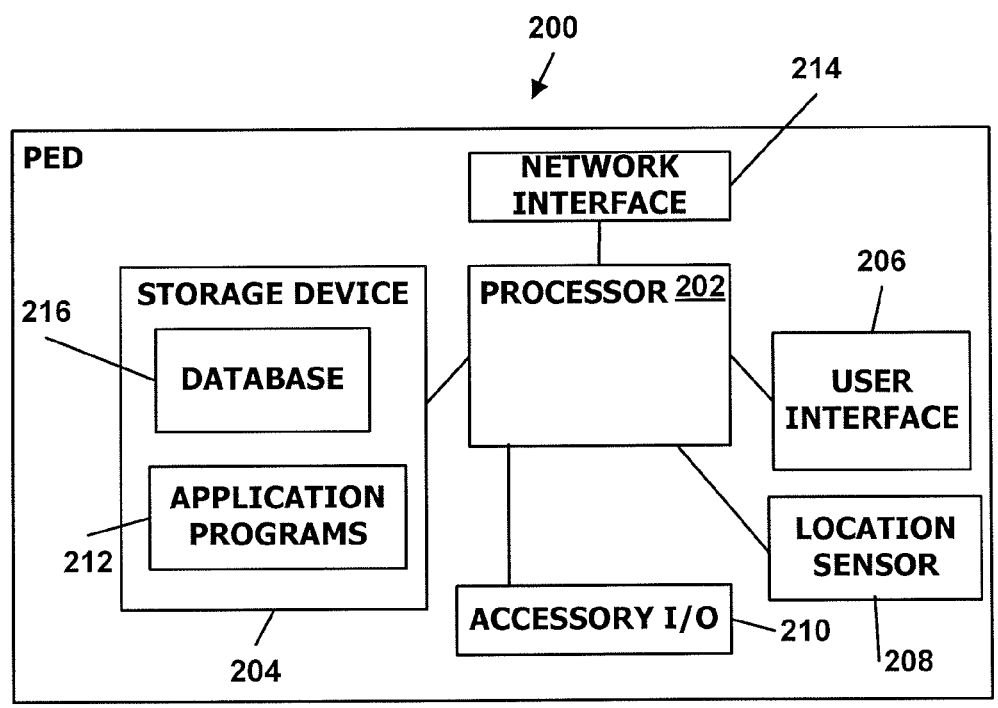
FIG. 2 is a functional block diagram of the portable electronic device according to an embodiment of the present invention.

FIG. 2 is a functional block diagram of a PED 200 according to an embodiment of the present invention. PED 200 can include processor 202, storage device 204, user interface 206, location sensor 208, accessory input/output (I/O) interface 210, and network interface 214.

Processor 202, which can be implemented as one or more integrated circuits (e.g., a single core or multi-core microprocessor(s) or microcontroller), can control the operation of PED 200. For example, in response to user input/selection, the processor can communicate with an external device such as a store-based server computer to get more information about a product or a service offered by the store.

Storage device 204 can be implemented, e.g., using disk, flash memory, or any other non-volatile storage medium. In some embodiments, storage device 204 can store one or more application programs 212. Each application program can provide functionality for performing one or more tasks. For example, an application program can provide word processing capability; another application may provide the ability to browse the Internet, etc. One or more of application programs 212 can detect a location of the user and provide information about products and/or services offered by a store based on the location of the user. Storage device 204 can also store other information such as information about a user's contacts (names, addresses, phone numbers, etc.); scheduled appointments and events; notes; and/or other personal information. In still other embodiments, storage device 204 can store one or more programs to be executed by processor 202 (e.g., video game programs, personal information management programs, etc.).

In some embodiments, storage device 204 can include a database 216. Database 216 can store information related to one or more stores for faster access by PED 200. In some embodiments, database 216 can store information about one or more stores most frequently visited by the user, e.g., stores within a certain geographical area of the user's residence, information about the user's reservations and/or appointments at the store, etc.

User interface 206 can include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). A user can operate the various input controls of user interface 206 to invoke the functionality of PED 200 and can view and/or hear output from PED 200 via user interface 206.

Location sensor 208 can be any component or combination of components that can detect the location of PED 200 at any given time. In some embodiments, location sensor 208 can include a global positioning satellite (GPS) receiver that can communicate with one or more positioning satellites in order to determine the location of PED 200 at any given time. In some embodiments, location sensor 208 can determine the location of PED 200 using local Wi-Fi hotspots or using cellular phone triangulation technique. In other embodiments, PED 200 can communicate with an external location service provider that determines the location of PED 200 and communicates that location to PED 200.

Accessory I/O interface 210 can allow PED 200 to communicate with various accessories. For example, accessory I/O interface 210 might support connections to a joystick, a remote control, or the like. In one embodiment, accessory I/O interface 210 includes a 30-pin connector corresponding to the connector used on iPod® products manufactured and sold by Apple Inc. Alternatively or additionally, accessory I/O interface 210 can include a different connector and/or wireless interface (e.g., Bluetooth or the like).

Network interface 214 can allow PED 200 to communicate with other devices on a network and exchange information with the other devices. For example, in some embodiments, network interface 214 can be used to connect with an external database in order to determine information about products and/or services offered by a particular store. In some embodiments network interface 214 can include radio frequency (RF) transceiver components for accessing wireless voice and/or data networks (e.g., using cellular telephone technology, advanced data network technology such as 3G, 4G, or EDGE, Wi-Fi (IEEE 802.11 family standards), or other mobile communication technologies, or any combination thereof), GPS receiver components, and/or other components. In some embodiments network interface 214 can provide wired network connectivity (e.g., Ethernet) in addition to or instead of a wireless interface. Network interface 214 can be implemented using a combination of hardware (e.g., antennas, modulators/demodulators, encoders/decoders, and other analog and/or digital signal processing circuits) and software components.

It will be appreciated that the system configurations and components described herein are illustrative and that variations and modifications are possible. The PED can have other capabilities not specifically described herein. Further, while the PED is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

As described above, a user can receive information about the store and the products and services offered by the store via the customer service application resident on the user's portable electronic device. In some embodiments, the user can activate the customer service application in order to search for a store nearest to his current location and when he visits the store, the customer service application can receive and display information related to the store. However, it may not be useful to display information related to the store unless it is known that the user is actually near or in the store. In some instances, the user may activate the customer service application but may not actually visit a store. In such instances, displaying information about a product or service offered by the store may not be useful to the user and may actually be distracting to the user.

Figure 3A:
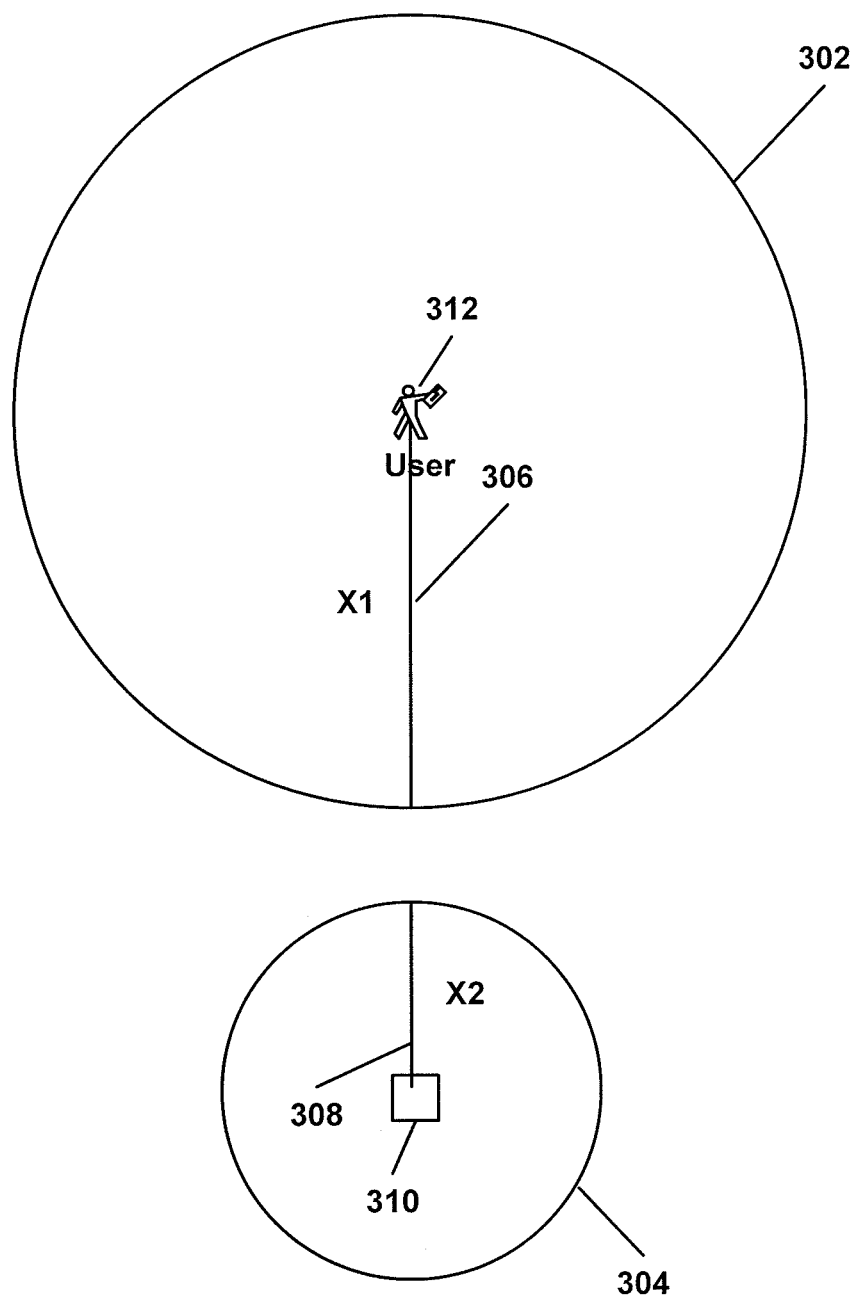
FIGS. 3A and 3B are schematics illustrating a technique for determining when to display store related information on a user's portable electronic device according to an embodiment of the present invention.
Figure 3B:
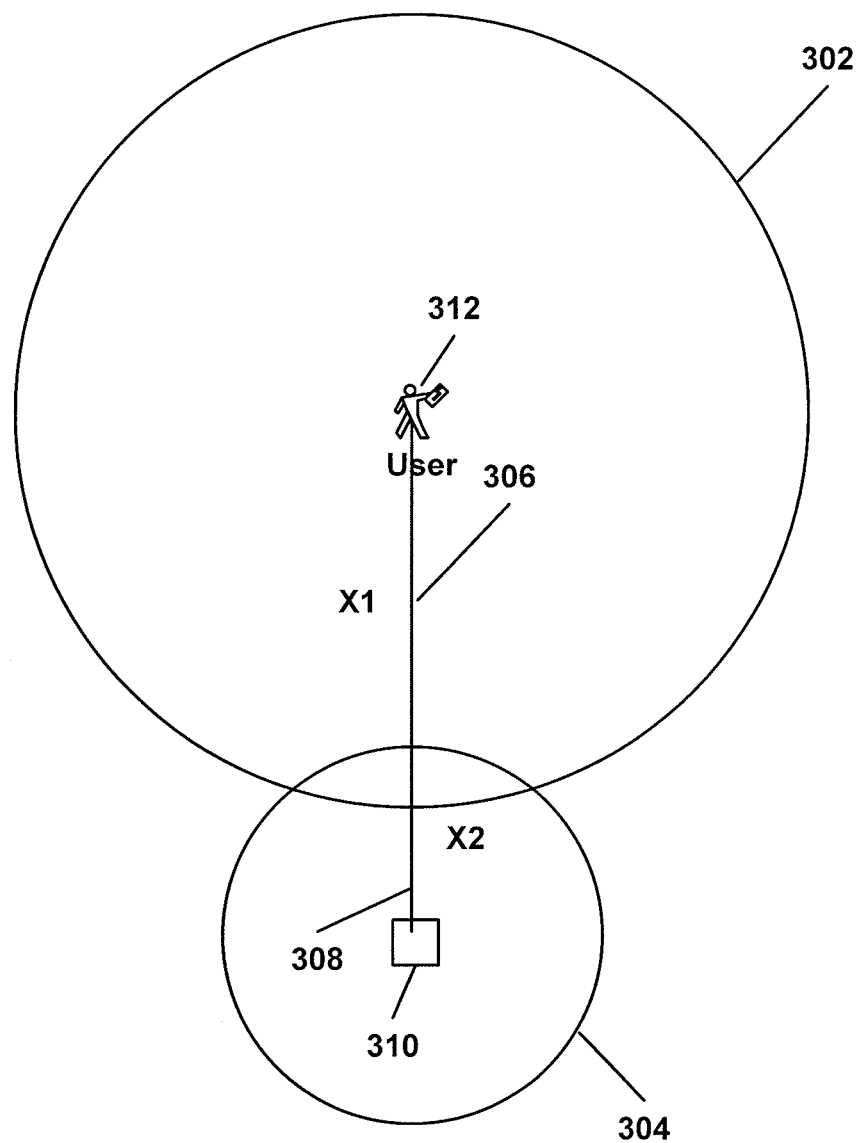

FIGS. 3A and 3B illustrate a technique to determine an appropriate time to start presenting information related to a store to the user on his portable electronic device according to an embodiment of the present invention.

In some embodiments, the time for beginning to display information to a user may depend on location of the user. The location determined for each user can have a certain accuracy value associated with it. For example, if the location is determined using GPS technique, the location accuracy can range, e.g., between 2 meters and 30 meters depending on the quality of the GPS sensor used. On the other hand, if the location is determined using local Wi-Fi hotspots the location accuracy is generally much lower than GPS, e.g., within 100 to 300 meters. Due to difference in accuracy of location determination it may be difficult to determine whether the user is at or near a store or farther away from the store.

In order to determine when to start delivering information related to the store to the user's portable electronic device, an area can be defined around a user's portable electronic device with the user's portable device being placed at the center of the defined area. In some embodiments, the shape of the defined area can be circular, square, triangular, or any other suitable shape. For ease of explanation a circular are is used in this description. Thus, in some embodiments, a circular area 302 is defined around the user's current location with user 312 being placed at the center of circular area 302. The radius X1 306 of circular area is defined by the location accuracy value related to the user's current location. For example, if the user's current location is determined using a GPS signal, X1 can be specified to be some value between 2 and 30 meters. On the other hand, if the location is determined using Wi-Fi hotspot information, circular area 302 may have a bigger radius 306, e.g., some value between 100 to 300 meters. The location detection method can vary based on many factors, e.g., whether user's portable electronic device has clear GPS connection (the user is out in the open) or whether user's portable electronic device cannot receive a GPS signal (user is inside a mall). As the user moves, circular area 302 also moves correspondingly since at any given time, user 312 is placed at the center of circular area 302. In addition, radius (or accuracy value) 306 can also be dynamically adjusted based on the location detection method being used. For example, if the user is initially inside a building, circular area 302 can have a first radius since the location may be determined using methods other than GPS. If the user then moves outside of the building, e.g., to an open parking lot, circular area 302 can get smaller and can have a second radius that is smaller than the first radius. Thus, the size of circular are can be dynamically adjusted based on user location.

In some embodiments, accuracy value 306 can be predetermined based on the method being used to detect the location. In some embodiments, accuracy value 306 can be programmable and may be adjusted periodically based on the user's location.

Similar to area 302 for user 312, another circular area 304 can be defined for a store 310 based on the location of store 310 and with store 310 being placed at the center of area 304. Usually, store 310 will have fixed location coordinates, e.g., latitude and longitude. Detection radius 308 for store 310 can have a value X2 that can be programmable and based on various factors such as store dimensions, store layout, etc. It is to be noted that circular area 304 is used herein merely for ease of explanation. Similar to area 302, area 304 can be of other shape such as a square, triangle, etc.

In operation, a host server computer (not shown), e.g., located at store 310, can determine whether a user is "in-store." In this instance, "in-store" means that the user is either actually inside the store or within a predetermined distance from the store, e.g., anywhere within area 304. The predetermined distance can be programmed based on the characteristics of the store as described above. In some embodiments, the determination of whether the user is in-store or not can be based on detecting the current location for the user. However, it would be wasteful to have the host server computer constantly check to determine whether there is a user that qualifies as being in-store. In order to avoid this, a minimum accuracy threshold can be defined for the user location before the host server computer can begin the detection. For instance, the host server computer can be programmed to start detection if it determines that current accuracy value 306 for the user location is equal to or less than 500 meters. The reason being anything larger than the accuracy threshold will likely not be a good indicator for the user's actual location and hence it would be wasteful to detect and track that user. It is to be noted that the host server may be located either in the store or external to the store.

Once the accuracy value associated with the user's location is determined to be less than the accuracy threshold, the host server computer can begin detection of whether the user is in-store or not. As described above, area 302 associated with the user moves as the user moves. For purposes of detection, the user is considered to be at any location within area 302. The host server computer at the store can track user movement and associated area 302.

As the user moves, area 302 associated with the user also moves with him. If the user is walking towards store 310, then at some point a portion of area 302 will overlap with a portion of area 304. When any portion of area 302 overlaps with any portion of area 304, the user can be considered to be in-store, as illustrated in FIG. 3B. Thus, area 304 can be thought of as a "service area" of store 310. Once the user is determined to be in-store, the host server computer at store 310 can communicate with the customer service application resident on the user's portable electronic device and start providing store related information. In some embodiments, the customer service application may be activated by the user prior to the user entering the store. In other embodiments, once the user is determined to be in-store, the PED can automatically launch the customer service application.

Once the user is determined to be in-store, values for radius 306 and radius 308 can be temporarily increased automatically by a predetermined value resulting in the increase of the overlap region area between circular area 302 and circular area 304. For example, if a percentage of overlap is 20% at the time the user is detected to be in-store, then subsequent to the detecting of the overlap, the values for 306 and 308 are automatically increased such that the overlap may now be 40%. This is done to ensure that the user is not accidently determined to be out of store unless the user is truly a significant distance from the store. For example, if the store has a large area, some movements of the user within the store may temporarily cause areas 302 and 304 to not overlap resulting in the determination that the user is out of store when in fact the user is still in the store. Temporarily increasing the radius values for areas 302 and 304 increases the overlap region and alleviates such false determination.

In some embodiments, the host server computer in the store communicates with an external location service provider server that can provide information about the user's location, accuracy value, etc. to the host server computer. The host server computer can then use this information to decide whether to start detection and determine whether the user is in-store. In some embodiments, the in-store detection/determination can be done by the user's portable electronic device based on location information for one or more stores stored by the portable electronic device. The store location information can be updated periodically by connecting to an external server that can provide the updated information for all stores requested by the user. Performing the detection using the user's portable electronic device can be faster due to the decreased lag time compared to using the host server computer in the store and the external location service provider server.

In some embodiments, the user's portable electronic device can detect its location and determine whether the user's portable electronic device is in the proximity of a store or in a store. The user's portable electronic device can make this determination using the techniques described above. The user's portable electronic device may maintain a database of stores and their associated locations. The user's portable electronic device compares its current location to one or more of the store locations in its database to determine whether the portable electronic device is in proximity to any of stores in the database. Periodically, the user's portable electronic device may communicate with a central server to update the store and location information database. Thus, the portable electronic device can determine whether to start receiving store-specific information. Once the portable electronic device has determined that it is near or in a store, the customer service can be either automatically or manually launched to start displaying information to the receiver, as discussed throughout this specification In some embodiments, once the user has left the store, e.g., there is no overlap between area 302 and area 304, connection between the user's portable electronic device and the host server computer of the store can be terminated. In some embodiments, the host server computer may not conclude that the user is out of store based on a single instance of non-overlap between areas 302 and 304, if the user is previously deemed to be in-store. For example, a user who was previously deemed to be in-store may step out of the store for some reason and then step back into the store. It would be wasteful to have the host server reestablish communications with the user's PED.

In order to avoid this unnecessary delay and inconvenience to the user, once the host server computer has determined that there is no longer any overlap between areas 302 and 304 for a user, where an overlap existed previously, the host server computer may wait for a predetermined amount of time before marking the user as being out of store. At the expiry of the predetermined time, the host server computer can check again to determine the location of the user. If the second check also reveals that there is still no overlaps between areas 302 and 304, the host server computer can then consider that the user is truly out of the store and stop sending any more information to the user's portable electronic device. This is especially critical when areas 302 and 304 merely touch each other without overlap or barely overlap, e.g., user is standing on the boundary of the store. It would be very inconvenient for the user if the customer service application constantly toggles between in-store and out of store mode as the user moves along the border of the store. Performing the multiple checks described above and waiting for the predetermined time to elapse can help alleviate this issue and provide for a more engaging user experience. In addition, performing multiple checks to determine whether the user is truly out of the store reduces the likelihood of erroneously concluding that the user is out of store if incorrect location information is received from the external location service provider server or incorrect location information is determined by the host server computer for the user at any given time after the user is determined to be in-store.

It is to be noted that the actions above are described as being performed by the host server computer; however this is not needed. In some embodiments, the user's portable electronic device can detect its location with respect to a store and perform the actions described above.

Figure 4A:
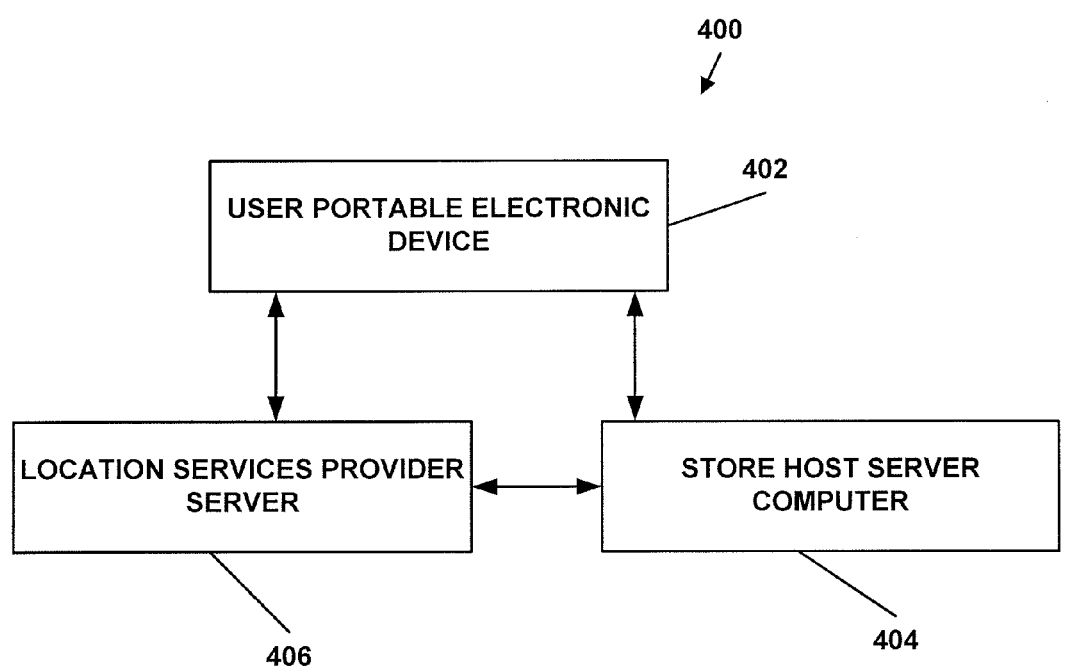
FIG. 4A is a block diagram of a system according to an embodiment of the present invention.

FIG. 4A is a block diagram of a system 400 that can be used to determine whether the user is in-store or out of store according to an embodiment of the present invention. System 400 can include a user portable electronic device 402 (e.g., implanting the portable electronic device 100 of FIG. 1), a store host server computer 404, and a location service provider server 406. As described above, in one embodiment, host server computer 404 determines the location of the user based on location information of the user provided by location service provider server 406. Store host server computer 404 and location service provider server 406 can be implemented using a general purpose computer server equipped with requisite hardware to provide the above-mentioned functionality. In some embodiments, store host server computer 404 and location service provider server 406 can be implemented as a single unit.

As described above, in one embodiment, the host server (e.g., the "in-store server") communicates with the user's portable electronic device to determine whether the user is close enough to the store or actually inside the store. Based on that determination, the in-store server may send store related information to the user's portable electronic device via the customer service application. In other embodiments, the user's portable electronic device can determine its location with respect to the store and start receiving store related information from the host server. In some embodiments, the host server may be located external to the store and may store information for more than one store.

Figure 4B:
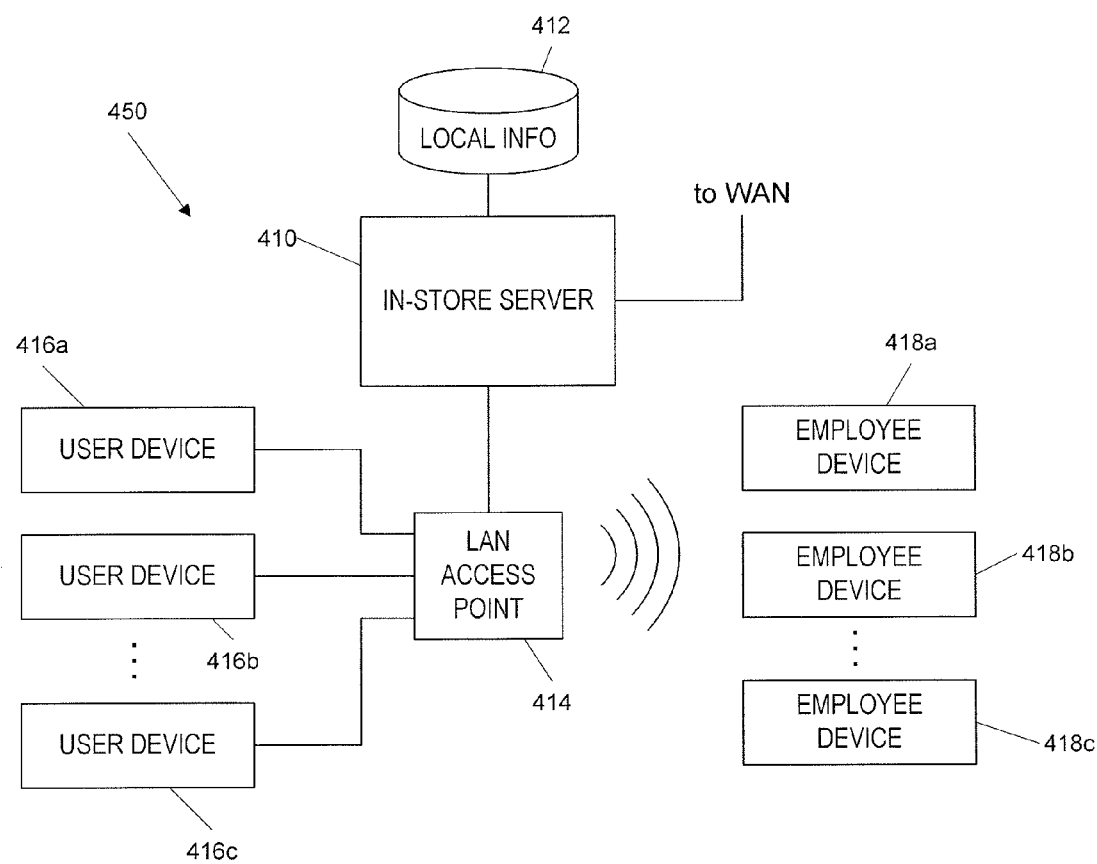
FIG. 4B illustrates an in-store network according to an embodiment of the present invention.

FIG. 4B illustrates an in-store network 450 according to an embodiment of the present invention. In-store network 450 can be a stand-alone network. Network 450 is managed by an in-store server 410, which can be connected to a wide area network (WAN), allowing server 410 to communicate with a larger retail network, if desired. In-store server 410 manages a local information store 412. In some embodiments, in-store server 410 may be physically located external to the store. The meaning of "in-store" in this context indicates that the server 410 manages/includes local information for a particular retail store. "In-store" in this context does not necessarily relate to the actual location of server 410, although in some embodiments server 410 may be physically located in the store. Local information store 412 can include store-specific information such as products available for sale at the store, workshops and other information sessions available at the store, store location information, etc. In some embodiments, local information store 412 can include product information; if in-store network 450 is part of a larger retail network, the product information can be downloaded from that network. In other embodiments, product information can be obtained from product manufacturers, wholesalers, distributors or the like and stored in local information store 412.

In-store server 410 is connected to a local area network (LAN) access point 414, which facilitates communication with other devices in in-store network 450. Those other devices can include user portable electronic devices 416a-c (e.g., implemented using PED 200 of FIG. 2) and/or employee devices 418a-c. (any number of each type of device can be included.) Portable electronic devices 416a-c can provide product information and additional functionality as described herein, and connections of a given portable electronic device 416a-c to LAN access point 414 can be wired or wireless as desired.

Employee devices 418a-c can be handheld devices carried or worn by employees of the store while on duty, and devices 418a-c can be configured with software related to the employee's job duties, including for example software for checking inventory, obtaining product information, scheduling customer-service appointments, processing payments, and so on. In some embodiments, employee devices 418a-c can receive customer assistance requests from portable electronic devices 416a-c and can alert employees to the request; examples are described below. Employee devices 418a-c can be configured for wireless communication with access point 414, allowing employees to move freely about the store while remaining in communication with network 450. In some embodiments, wired employee devices can also be used.

In some embodiments, when the user is determined to be in-store, the user's portable electronic device, e.g., 416a may communicate with in-store server 410 and vice versa via access point 414, which may be a wireless access point. When in-store server 410 receives a request for employee assistance from a user portable electronic device, e.g., via the customer service application, the in-store server may send a message to one or all of employee devices 418a-c indicating that a user is requesting assistance. An employee who is available to assist may send an acknowledgement to in-store server 410 via his employee device, e.g., 418a, informing the in-store server that he/she will help the user. In-store server 410 may then send a confirmation to the user's portable electronic device, e.g., 416a, that an employee will assist him/her, e.g., as illustrated in FIG. 8D below.

It will be appreciated that the various systems and devices described herein are illustrative and that variations and modifications are possible. Devices can be connected into networks of any desired scale, and operation of the devices can be coordinated across the network.

Figure 5A:
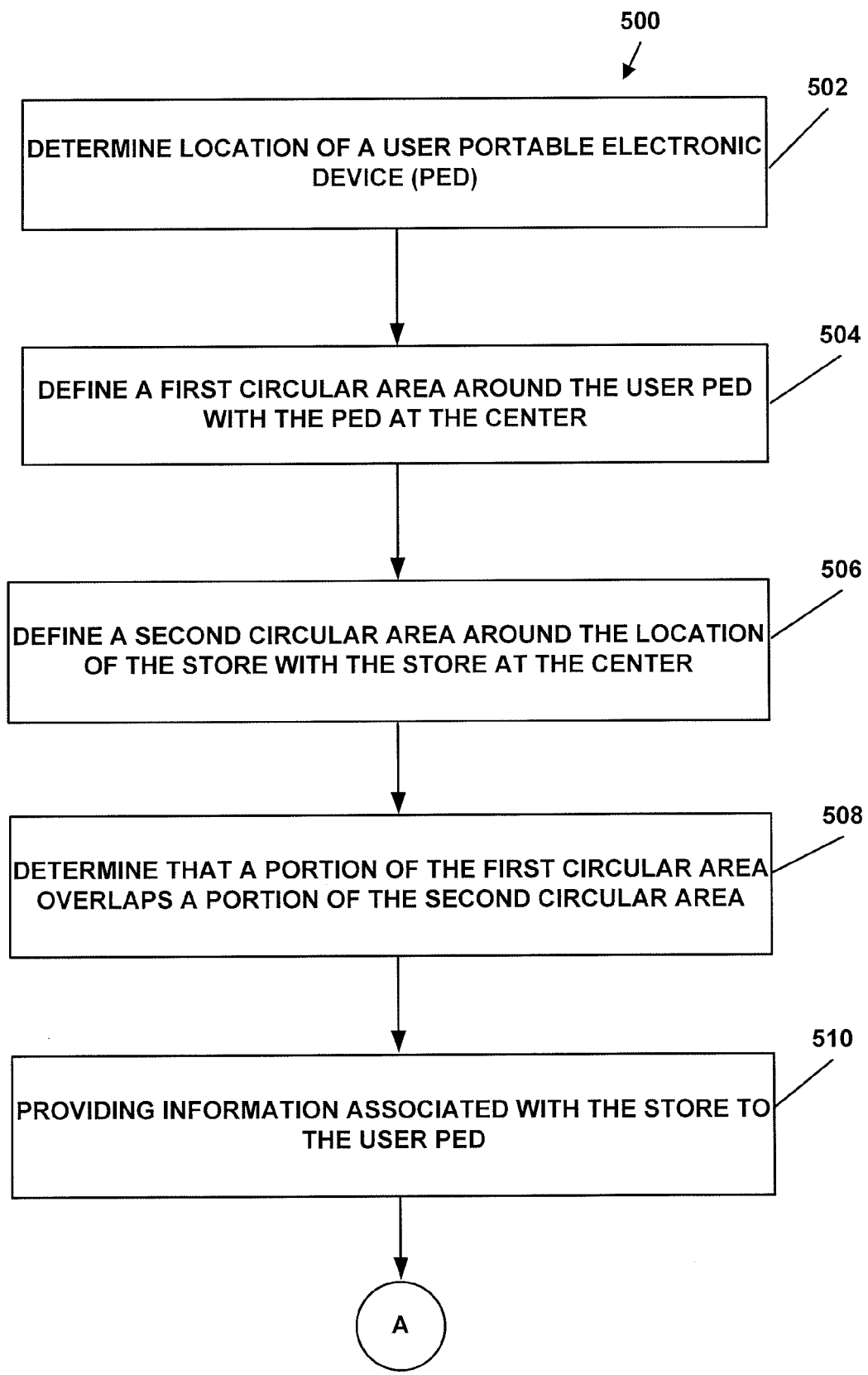
FIGS. 5A and 5B is a flow diagram of a process for interacting with a store host server computer using the customer service application according to an embodiment of the present invention.
Figure 5B:
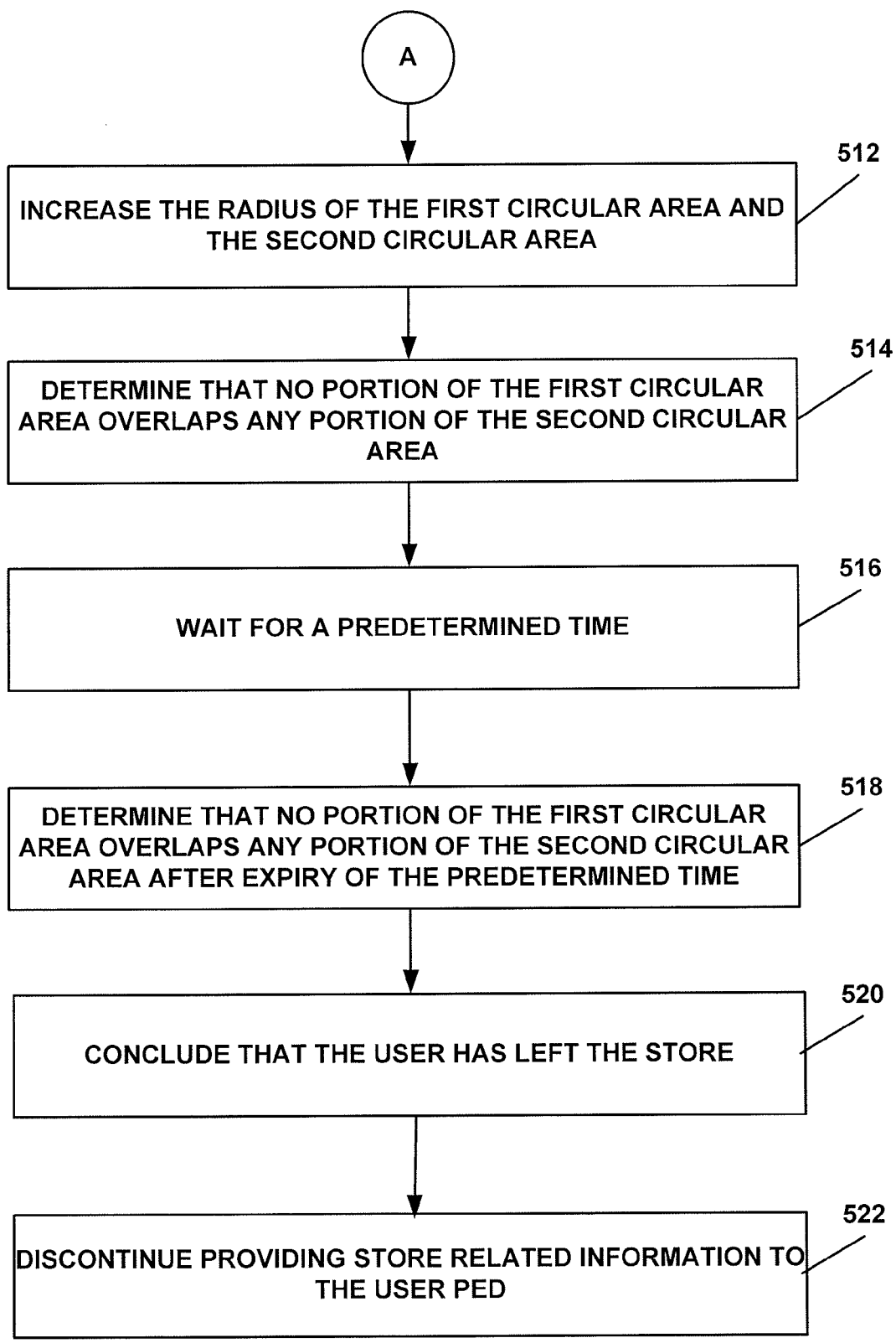

FIGS. 5A and 5B is a flow diagram of a process 500 for detecting whether a user is in-store or out of store according to an embodiment of the present invention. Process 500 can be performed, e.g., by host server computer 404 of FIG. 4A.

At block 502 in FIG. 5A, the host server computer can determine the location of the user via the user's PED. Thereafter, at block 504, the system can define a first circular area around the PED with the PED being at the center of the circle. The radius of the first circular area can be the accuracy value associated with the location determination method used. At block 506, the system can define a second circular area around the store with the store being at the center of the second circular area. In some embodiments, the radius of the second circular area may be pre-determined as described above. At block 508, the system can determine that a portion of the first circular area is overlapping with a portion of the second circular area. Based on this determination, the host server computer can conclude that the user is in-store. Once the user is determined to be in-store, the host server computer can provide information associated with the store to the user via the PED, at block 510.

Once the user is determined to be in-store, the host server computer can temporarily increase the radius of the first circular area and the second circular area at block 512 as shown in FIG. 5B. This reduces the possibility of the user being erroneously shown out of store based on the movements of the user inside the store. Periodically, the host server computer can check to see that the user is still in-store. At block 514, the host server computer can check to see whether there is still an overlap between the first and the second circular regions. If no overlap is detected, the host server computer can wait for a predetermined time at block 516 instead of immediately concluding that the user is out of store. After expiry of the predetermined time, the host server computer can once again check to see whether any portion of the first circular area overlaps any other portion of the second circular area at block 518. If it is determined that there is no overlap, the host server computer can conclude that the user is now out of the store at block 520. Thereafter, the host server computer can stop providing store related information to the user's PED at block 522.

It will be appreciated that process 500 described herein is illustrative and that variations and modifications are possible. Acts described as sequential can be executed in parallel, order of acts can be varied, and acts can be modified or combined. For instance, process 500 can be performed by the user's portable electronic device.

Figure 6:
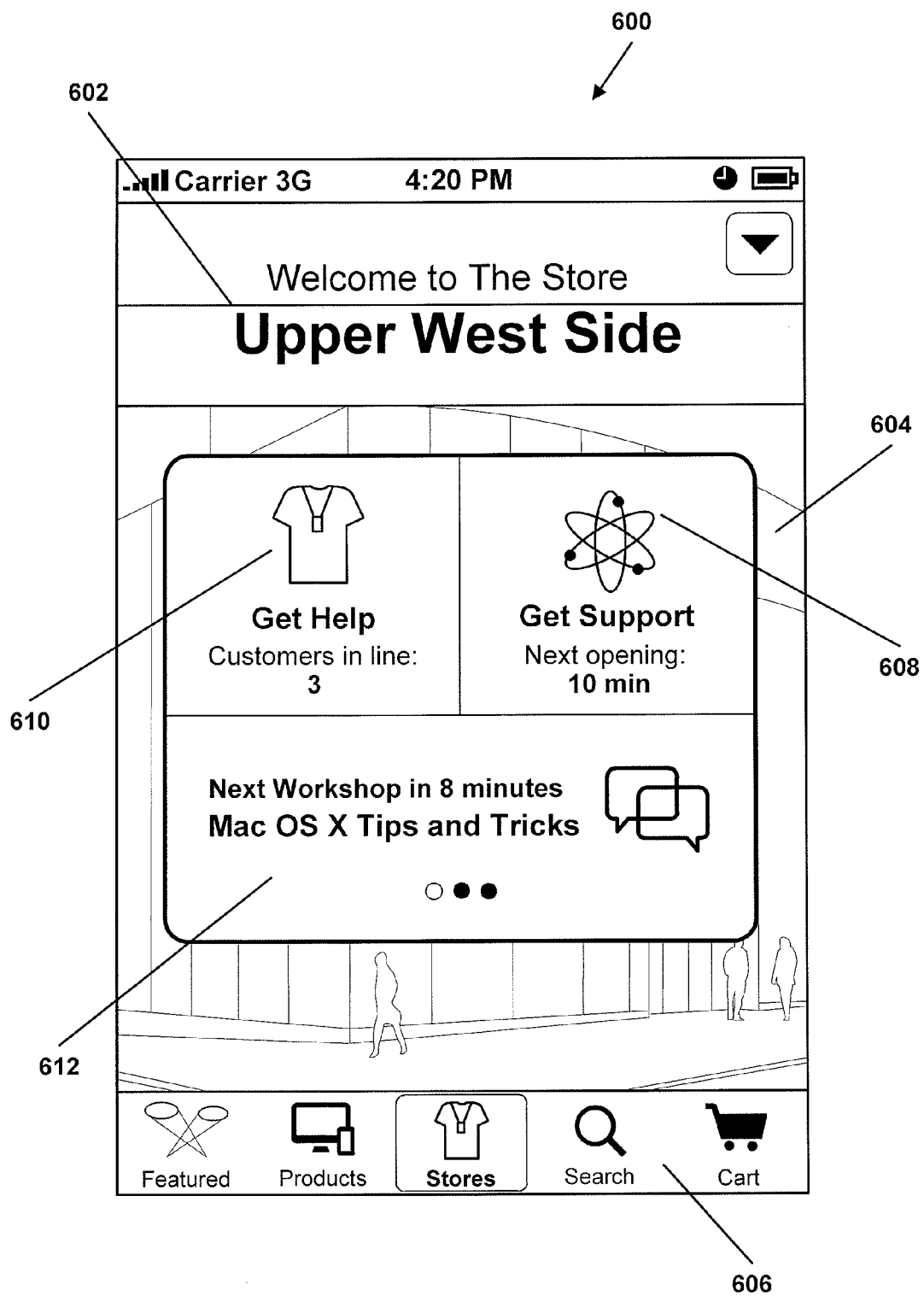
FIG. 6 illustrates a home screen for the customer service application according to an embodiment of the present invention.

Once the user is determined to be in-store, the store host server computer can start providing information to the user's PED via the customer service application. As described previously, the customer service application can be launched manually by the user or can be launched automatically once the user is determined to be in-store. FIGS. 6-8 illustrate some of the user interface screens associated with the customer service application according to an embodiment of the present invention.

FIG. 6 is a schematic view 600 of the functions available to a user via the customer service application according to an embodiment of the present invention. In some embodiments, schematic view 600 can be the first screen visible (e.g., home screen) when the customer service application is launched and the customer is determined to be in-store. As illustrated in FIG. 6, the home screen can include various user selectable options in addition to information display areas. Information display area 602 can display the name of the store that the user is currently visiting. In some embodiments, the application can display an image 604 in the background. Image 604 can be of the store that the user is currently visiting. From the home screen the user can select one or more of the options provided based on the type of information the user may be interested in. The home screen can also include a selection menu 606, from which the user can select any one of the icons to further navigate to the associated function.

In some embodiments, section 608 can be provided for the user to request support regarding any of the products sold by the store. In some embodiments, the user may also be informed of the approximate wait time before the next store person (e.g., an employee) is available to help him/her. The wait time can be dynamically updated by the host server computer. Section 610 can be used by the user to alert a sales person that the user needs help with one of the products or services. In some embodiments, section 610 can also display the number of customers waiting in line before the user. This gives the user an indication of where he/she would be in the queue should he/she choose to request help. Section 612 can provide information about the various events/workshops occurring at the store. For example, the store may offer workshops on how to use its products or offer demonstrations of various products. In some embodiments, section 612 can inform the user about upcoming events in the store and time for these events. If the user is interested in attending any event, he/she can register for the event using the customer service application.

Figure 7A:
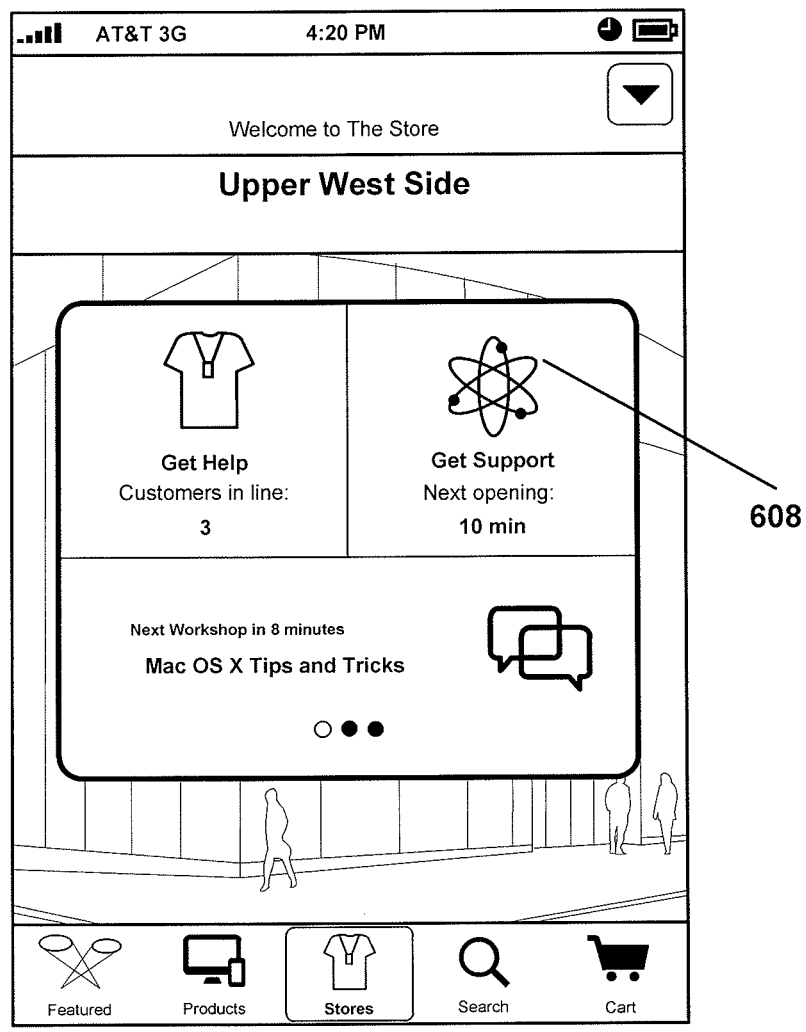
FIGS. 7A-7G are illustrative user interface screens associated with requesting a support service using the customer service application according to an embodiment of the present invention.
Figure 7B:
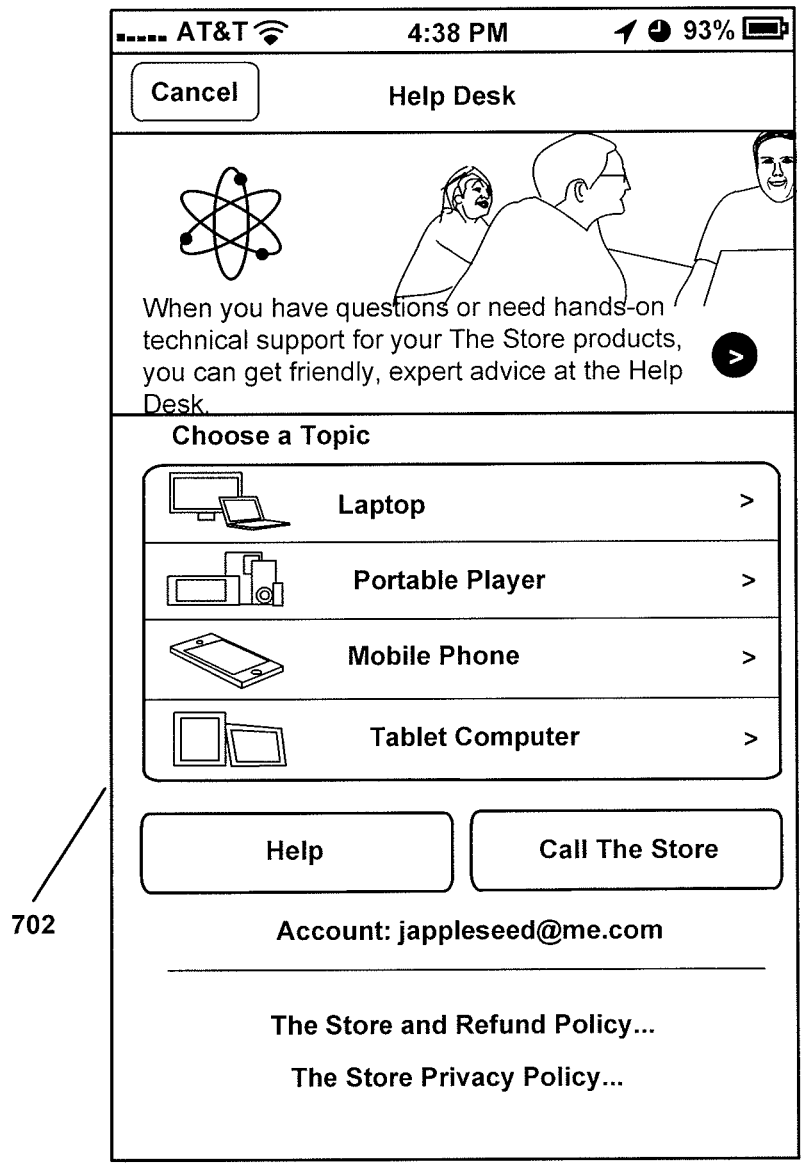
Figure 7C:
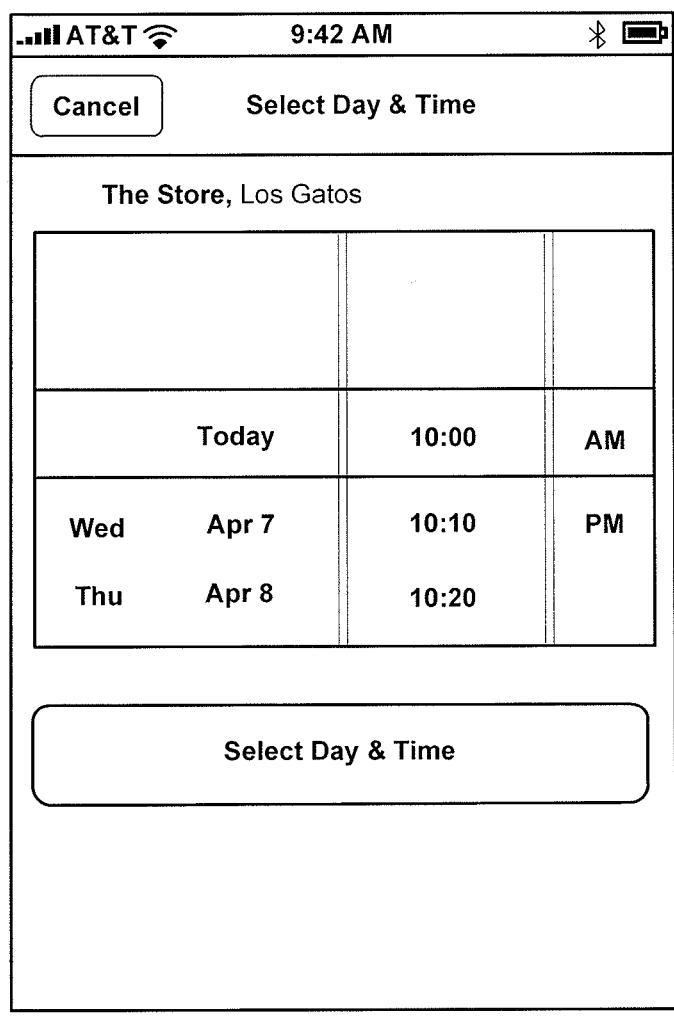
Figure 7D:
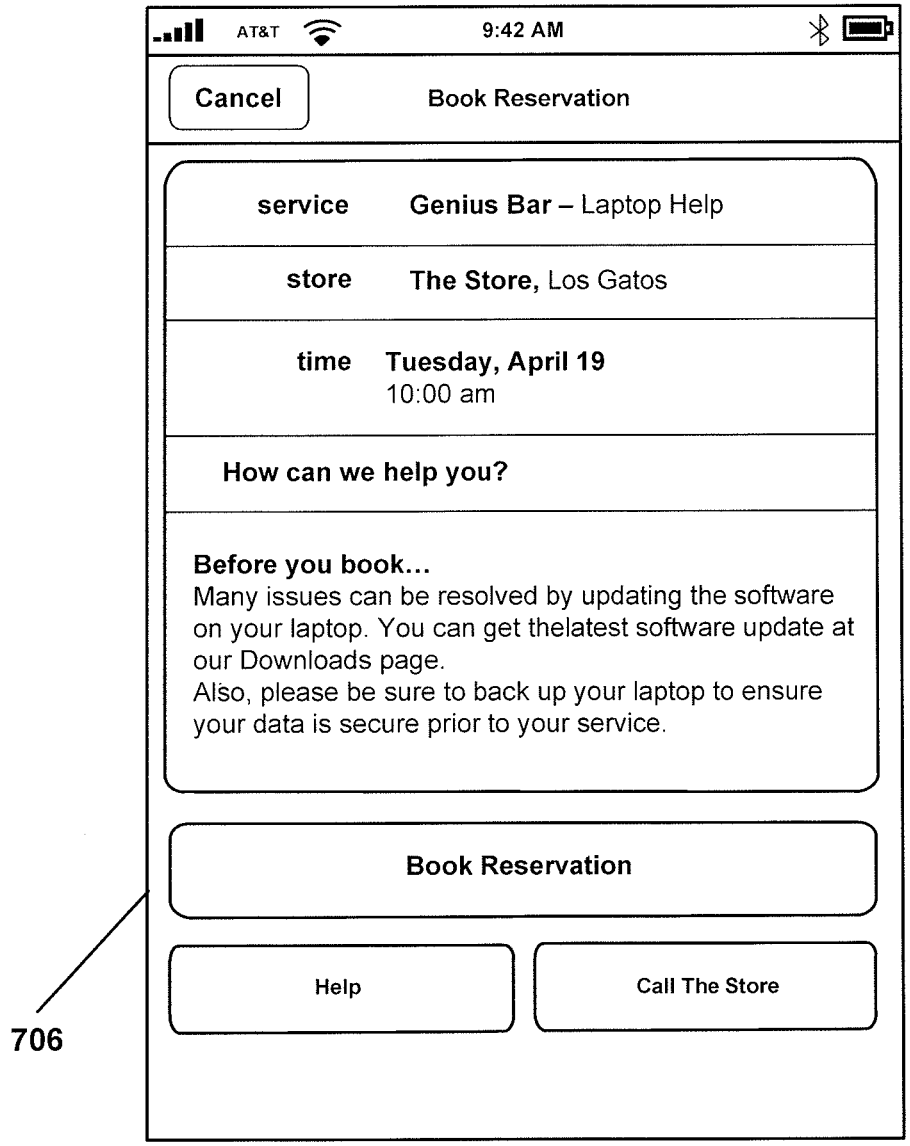
Figure 7E:
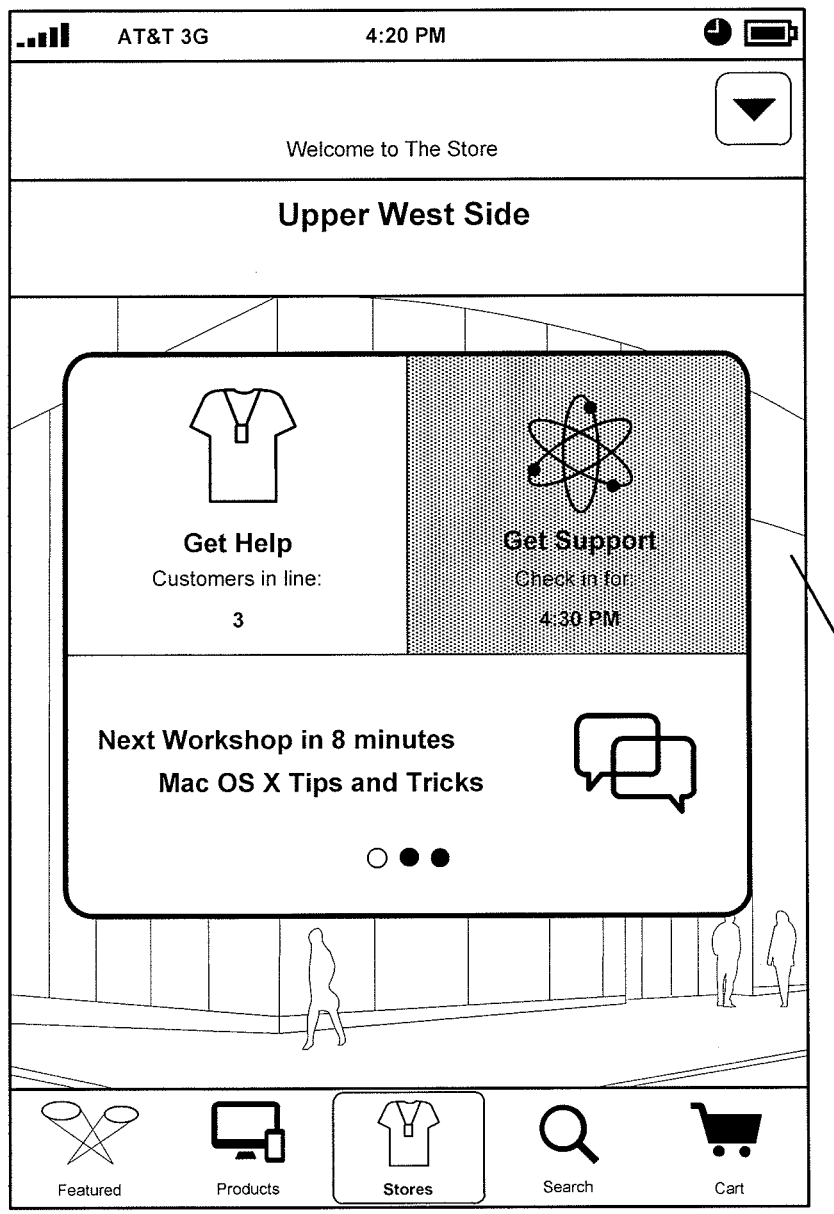
Figure 7F:
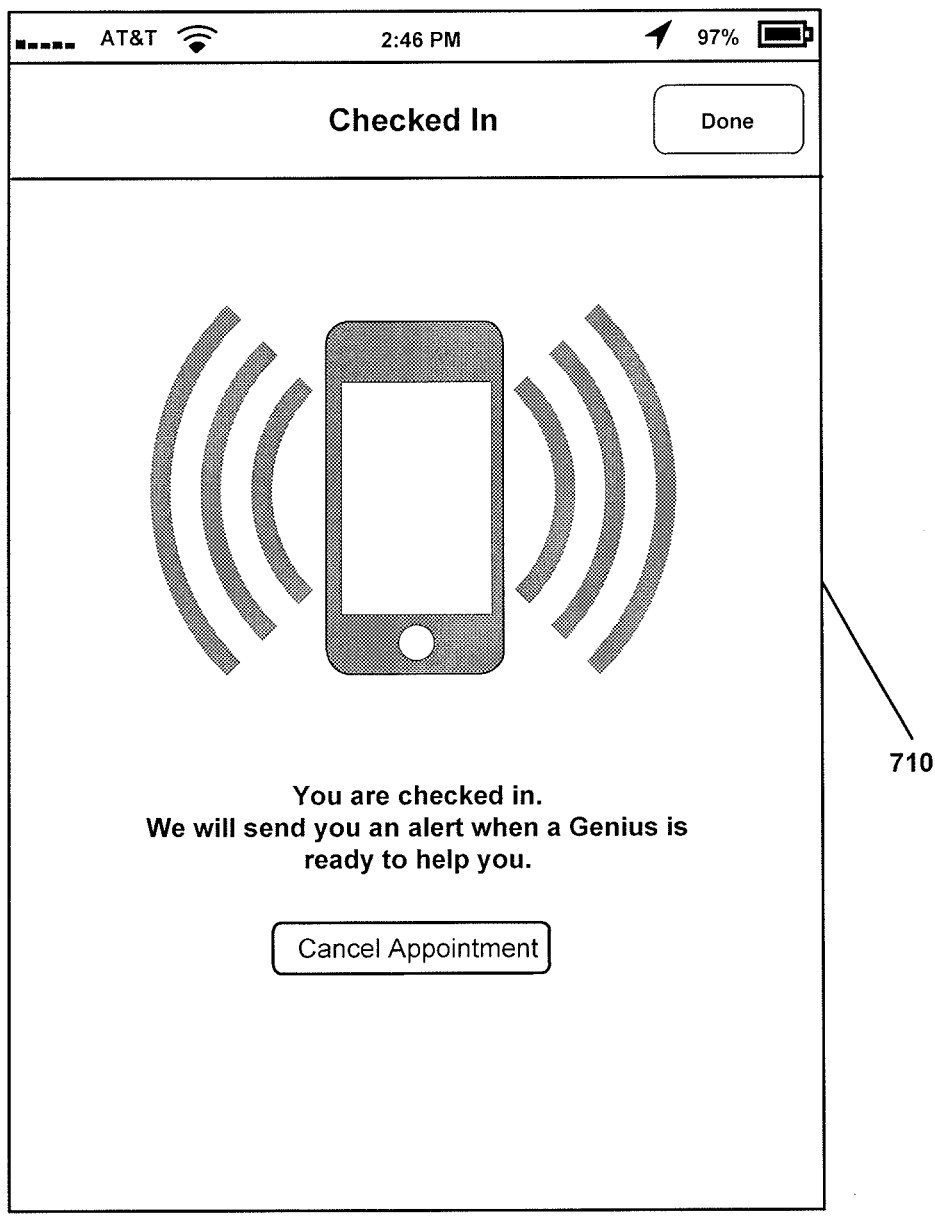
Figure 7G:
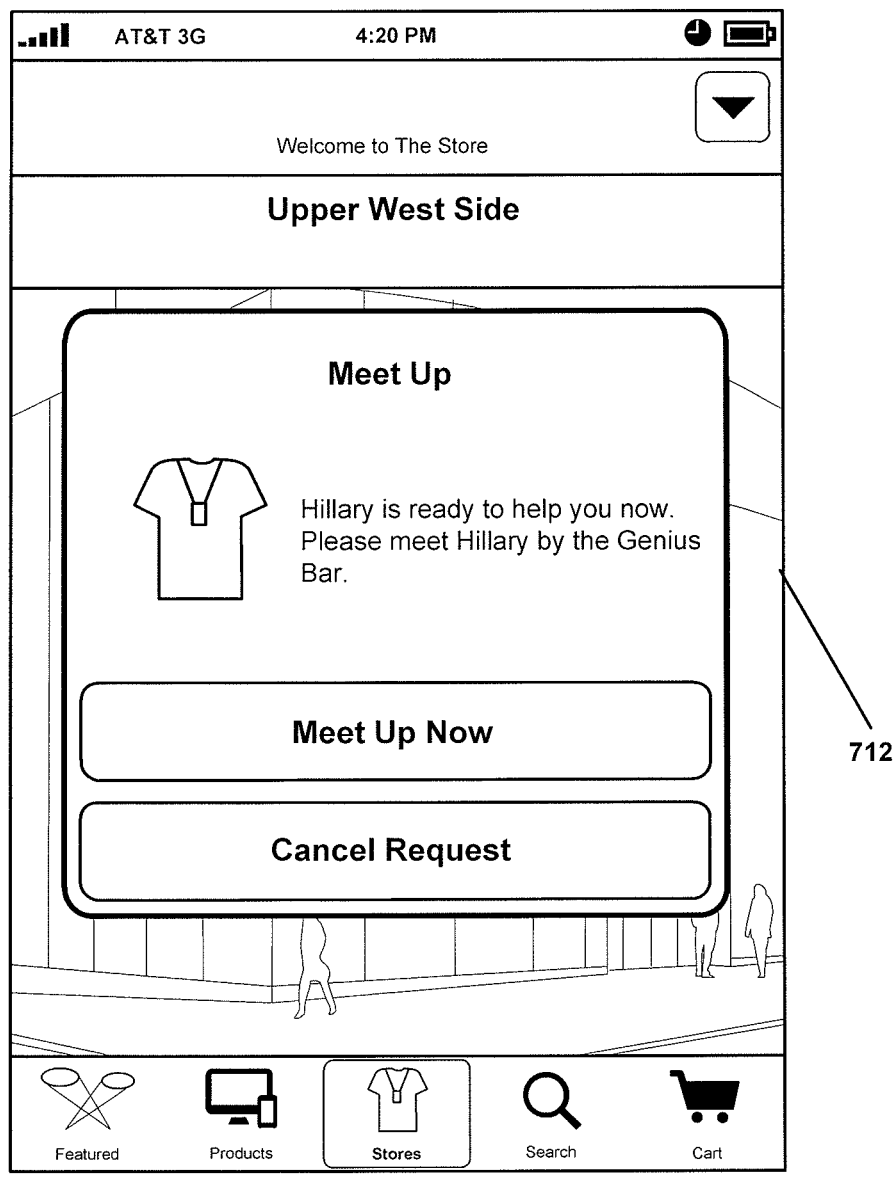

FIGS. 7A-7G show screenshots associated with requesting technical help for a product according to an embodiment of the present invention. The screenshots illustrated in FIGS. 7A-7G can be displayed on the user's portable electronic device. As illustrated in FIG. 7A, if the user wants technical help with one of the products, the user can select the "Get Support" option, e.g., by selecting section 608. Upon selection, the customer service application can display a screen 702 as shown in FIG. 7B for the user to select the product type that he/she needs help with. Once the user has selected a product, next screen 704 can be displayed to the user to enable the user to select a day and a time when he/she will be at the store to speak with a specialist. Thereafter, the user can be presented with screen 706 of FIG. 7D showing the details of his/her request and providing the user an option of reserving the time, in addition to other options. If the user chooses to book the reservation, the customer service application can send the request to the store host server computer and subsequently display screen 708 of FIG. 7E indicating that the user has been checked in for his/her requested time, e.g., based on reply received from the host server computer. Once the user is successfully checked in, the customer service application can display screen 710 of FIG. 7F informing the user that he/she has been placed in the queue and he will be alerted once someone is ready to help him/her. The user can then continue browsing the store until he/she receives a message indicating that someone is ready to help him/her. Once a technical specialist is available to assist the user, the host server computer can send a message to the user alerting the user that someone is ready to help him/her, as illustrated in screen 712 of FIG. 7G. In some embodiments, the host server computer may send, and the customer service application may display name of the technical specialist and a location to meet the specialist. Screen 712 can provide an option to the user to indicate his/her acceptance to meet the employee or to cancel the request, e.g., if the user meantime finds what he/she is looking for.

In some embodiments, while the customer is waiting to be helped by a specialist, the customer service application can display a ticker on the screen informing the user about his/her position in the queue. The ticker can be periodically updated to reflect the change in queue status and position of the user. The ticker can be located on the screen in a manner so as to allow the user to perform other functions using his/her PED while he/she is waiting for someone to help him/her.

Figure 8A:
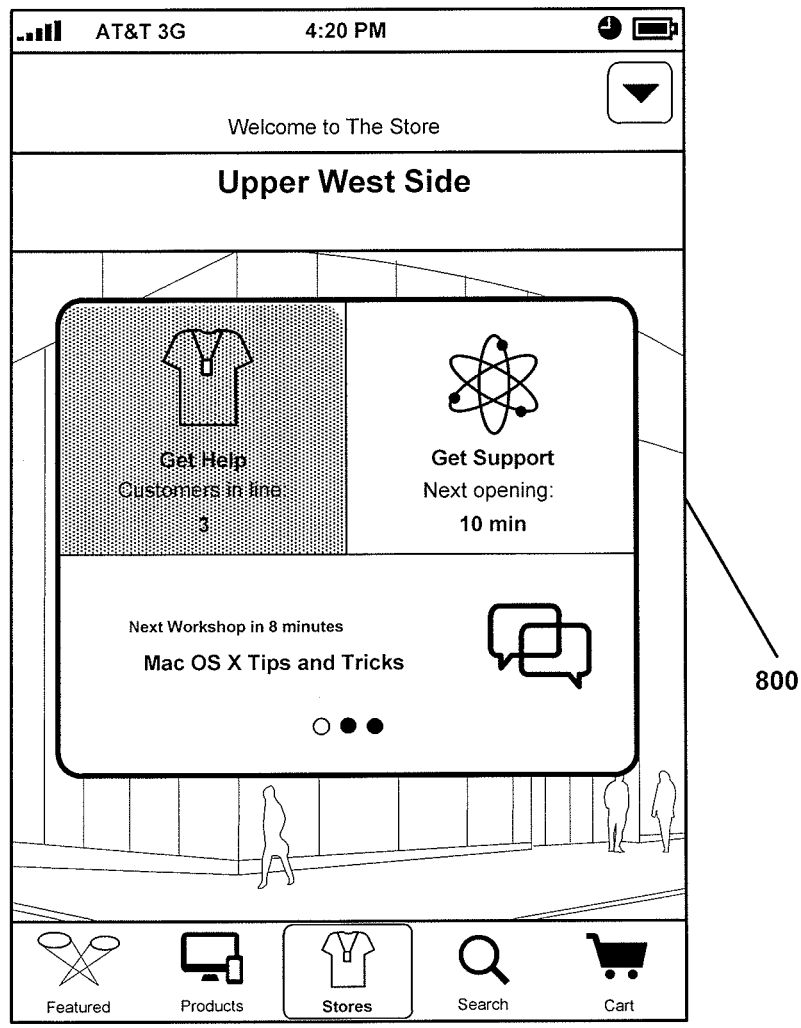
FIGS. 8A-8D are illustrative user interface screens associated with requesting shopping assistance using the customer service application according to an embodiment of the present invention.
Figure 8B:
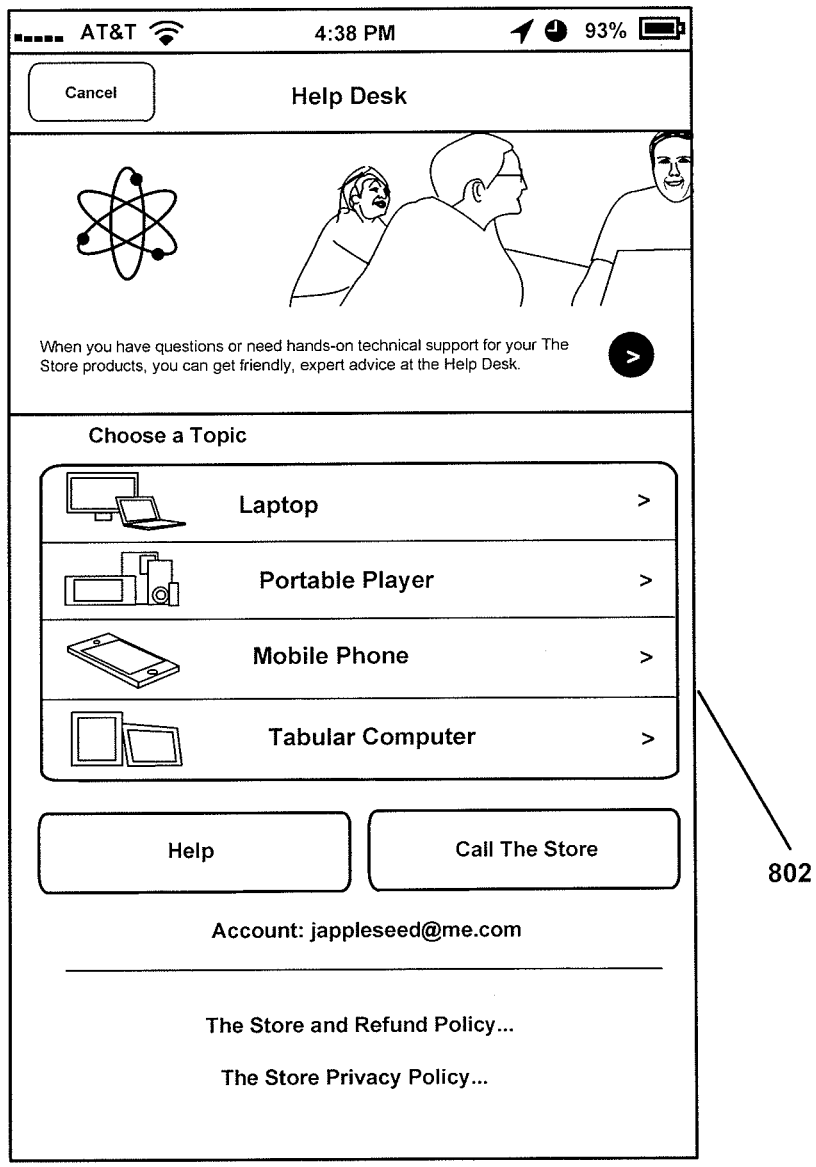
Figure 8C:
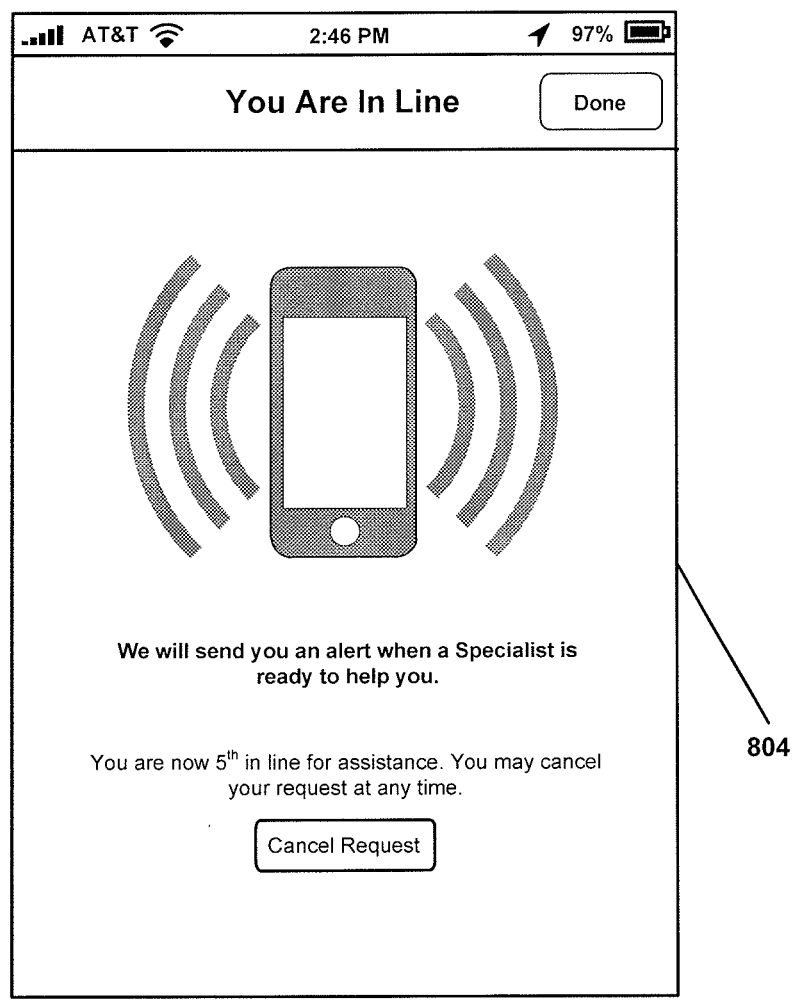
Figure 8D:
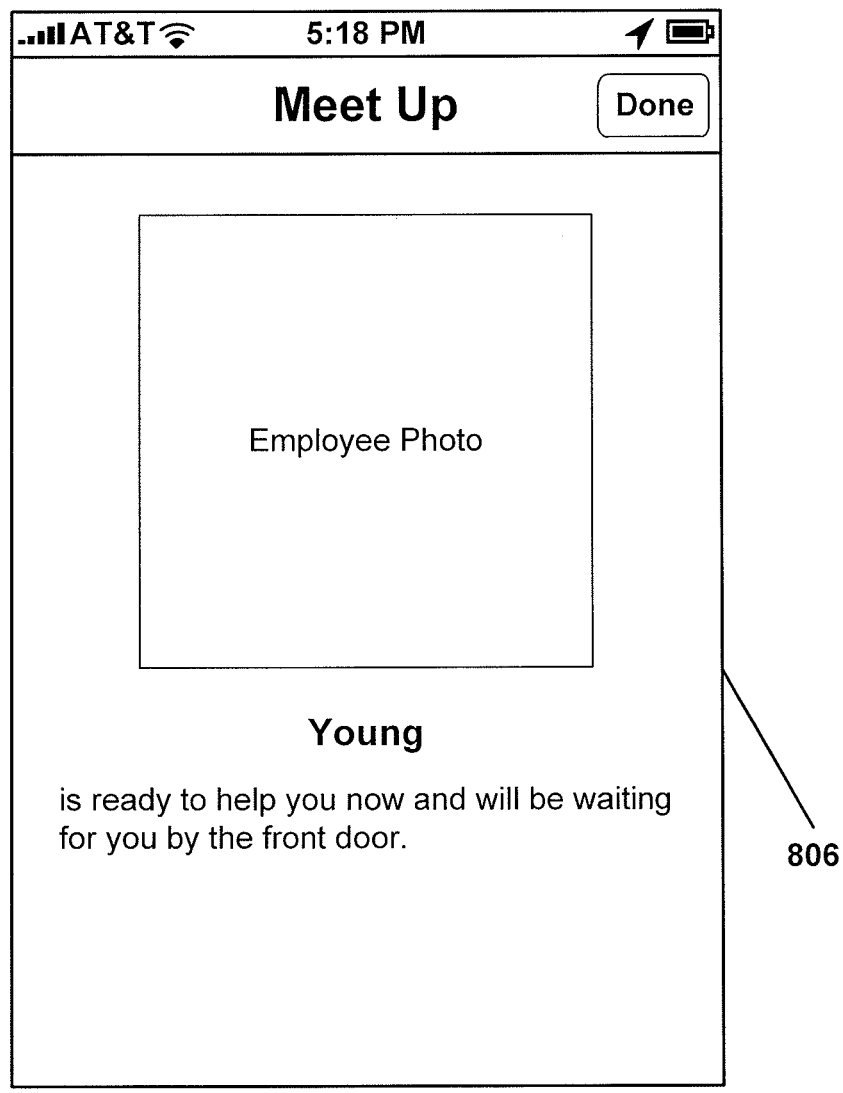

FIGS. 8A-8D show sample screenshots that can be displayed on the user's portable electronic device as part of the user requesting shopping assistance from a store employee according to an embodiment of the present invention. FIG. 8A illustrates a home screen 800 associated with the customer service application. On the home screen the "Get Help" section can inform the user about the number of people who have requested assistance before him/her and are now in a queue. If the user selects the "Get Help" option, he/she can be presented with screen 802 of FIG. 8B. Screen 802 can provide the user with the option to choose the product that the user needs help with. Once the user chooses a product, he/she is placed in a new queue or added to an existing queue, depending on whether a queue exists for the product that the user has chosen. Thereafter, the user can be presented with screen 804 of FIG. 8C. Screen 804 can inform the user about his/her place in the queue and let the user know that he/she will be alerted when someone is available to help. The user need not wait for the store employee and is free to browse other products or generally walk around the store. Once a store employee is available to help the user, the user's PED can receive a notification from the host server computer that a particular employee is available to help the user. In some embodiments, the customer service application can display screen 806 of FIG. 8D providing the user with a name, and optionally a photo, and a location to meet the employee.

Figure 9A:
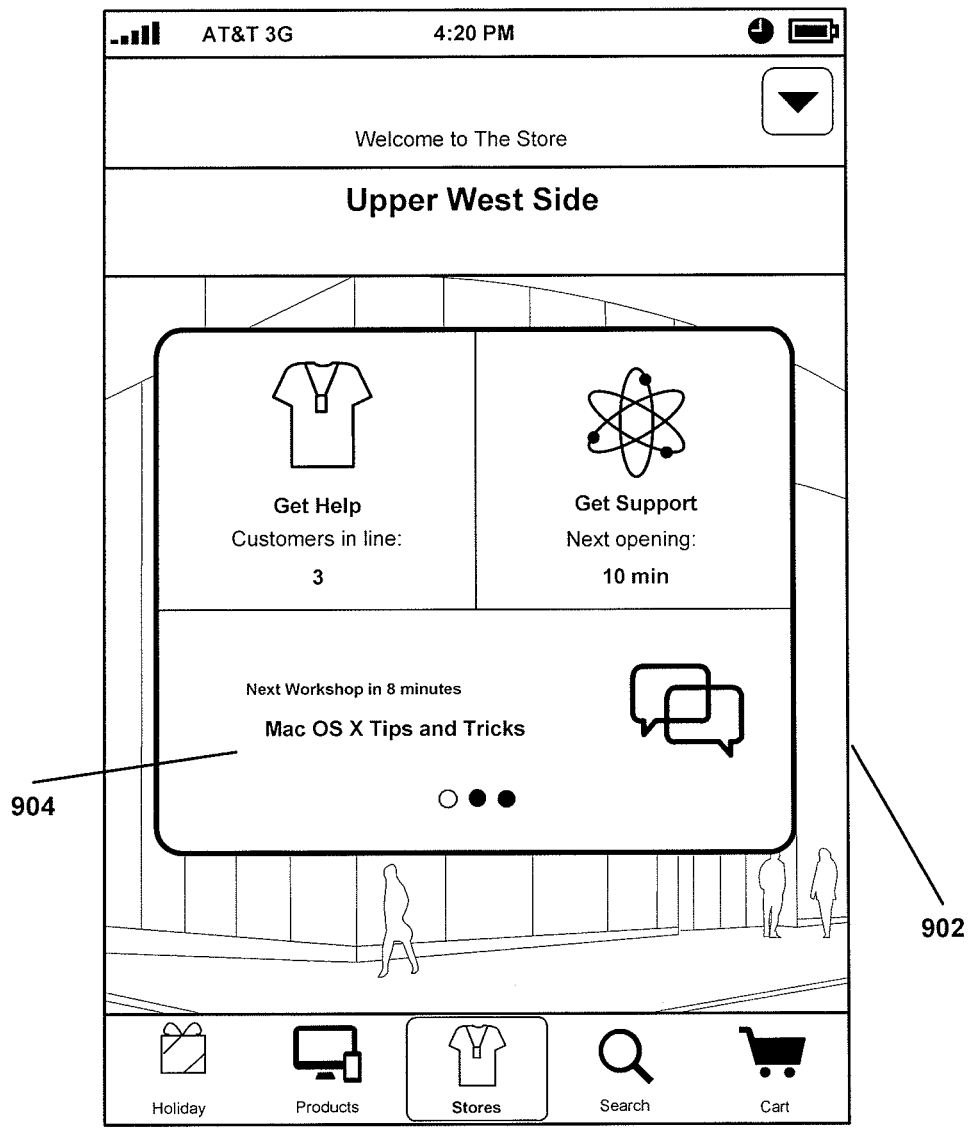
FIGS. 9A-9C are illustrative user interface screens associated with registering for an event/workshop using the customer service application according to an embodiment of the present invention.
Figure 9B:
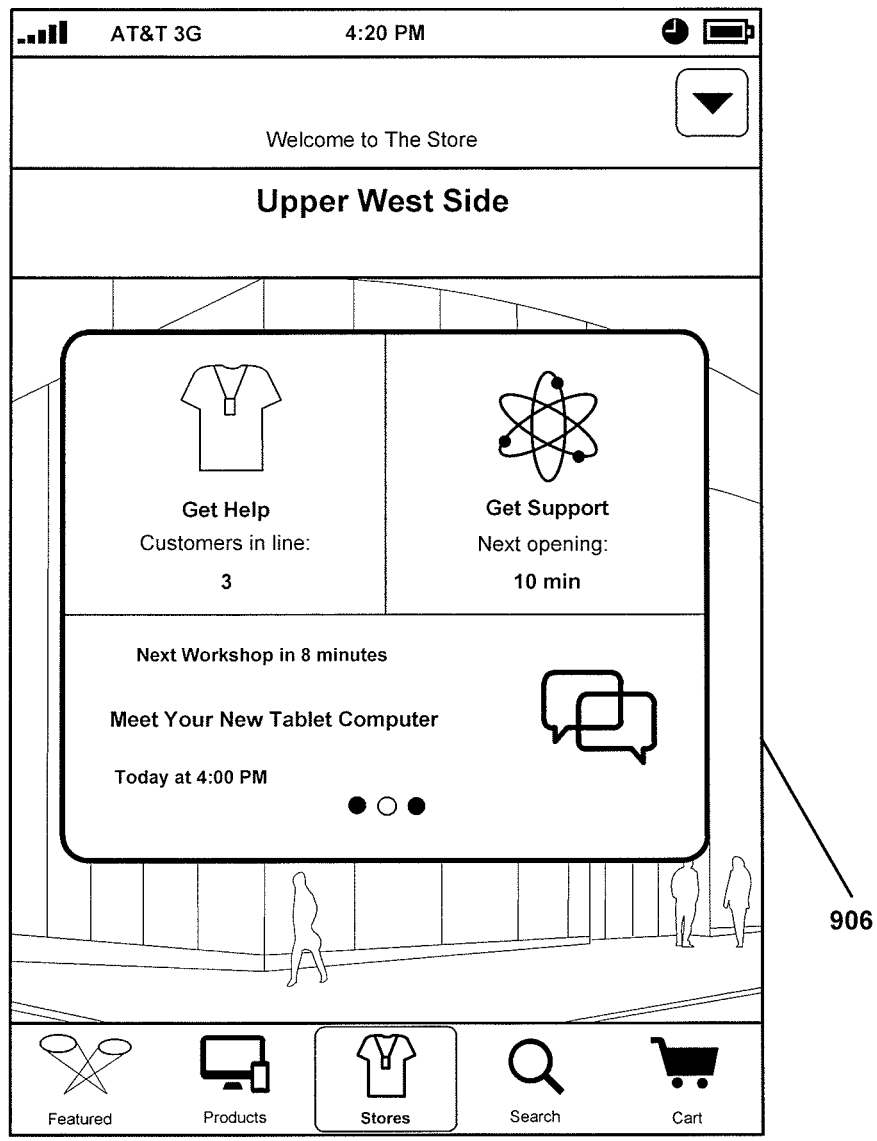
Figure 9C:
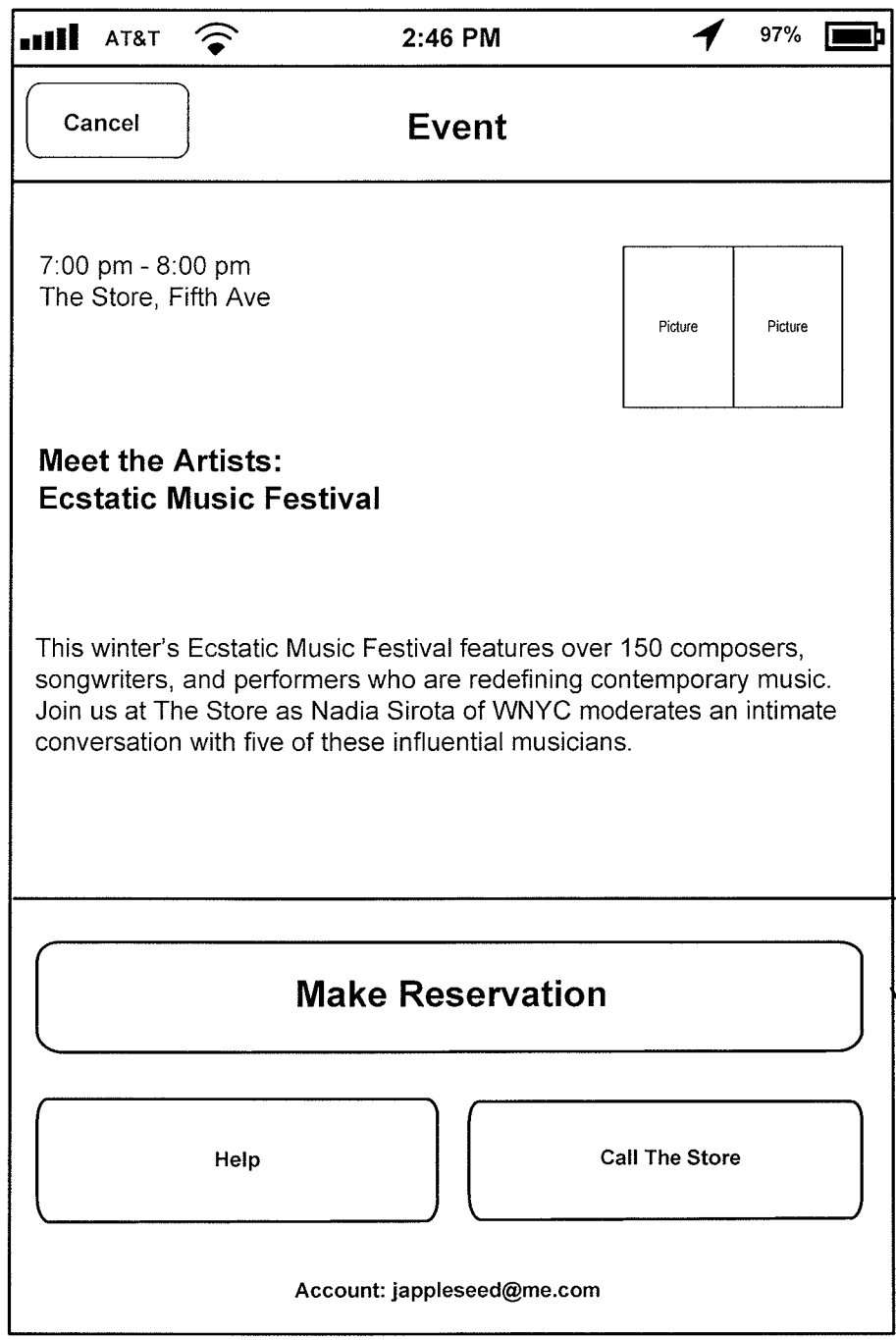

FIGS. 9A-C show sample screenshots associated with reserving a place at an event/workshop hosted by the store according to an embodiment of the present invention. When the customer service application is launched and the customer is in-store, home screen 902 of FIG. 9A can be displayed on the user's PED. Screen 902 can provide information about events and workshops in section 904 of screen 902. Information about events and workshops can include events/workshops occurring within a short time of user's arrival, e.g., within 15 mins, as depicted in FIG. 9A or events/workshops occurring on a particular day as illustrated in screen 906 of FIG. 9B. The user can select an event/workshop to know more details about it. For events/workshops that can be reserved, the user can be given an option to reserve his/her place in those events/workshops, as illustrated in screen 908 of FIG. 9C.

In some embodiments, the customer service application can store all of the user's reservations, help requests, and support requests. When the user is determined to be in-store and the customer service application is active, the user can be automatically checked in for his/her reservation and informed of his/her upcoming reservations, support request, etc. In addition, the host computer server can also alert that store personnel that the user has entered the store so that the employees can find and help the user.

It is to be noted that FIGS. 7A-7G, 8A-8D, and 9A-9C illustrate only some of the functionalities of the customer service application. The customer service application can include many more or less functionalities than the ones described above.

Figure 10:
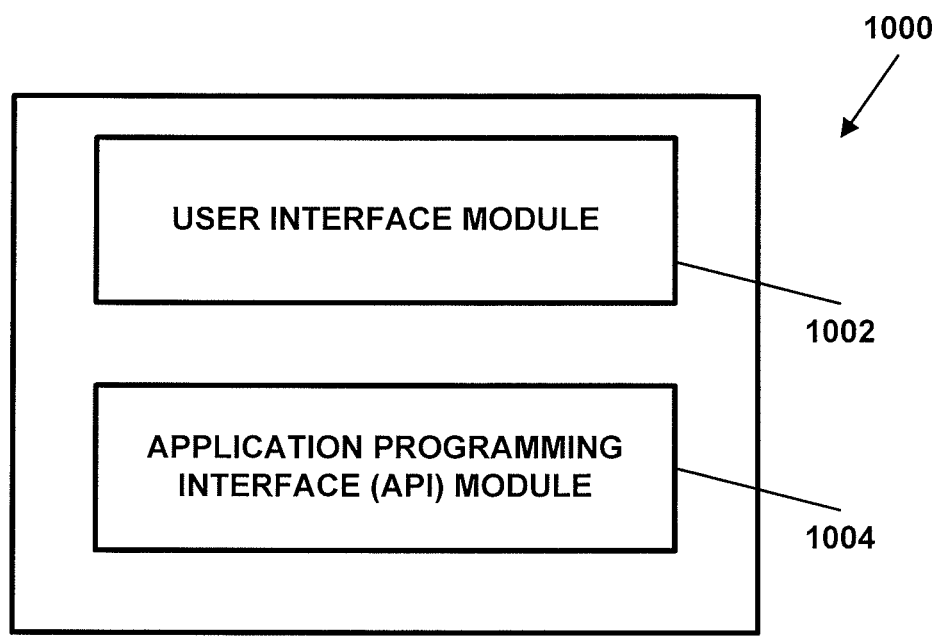
FIG. 10 is a functional block diagram of a customer service application according to an embodiment of the present invention.

FIG. 10 is a functional block diagram 1000 of the customer service application according to an embodiment of the present invention. The customer service application can include a user interface module 1002 that can provide the necessary user interface screens for display on the portable electronic device and accept user input via the user interface screens, e.g., user interface screens described above. The customer service application can also include an application programming interface (API) module 1004 that can receive the user input from user interface module 1002. API module 1004 can interpret the user input received from user interface module 1002 and convert that to an appropriate format to be communicated to an operating system for further processing. API module 1004 can also receive results of the processing from the operating system and convert that into a format suitable for user interface module 1002. User interface module 1002 can then display the information to the user.

It is to be noted that the block diagram 1000 is illustrative only and should not be interpreted to teach a specific amount, type, or arrangement of the modules. Also, one skilled in the art will realize that there can be additional modules for the customer service application or any other application.

Figure 11:
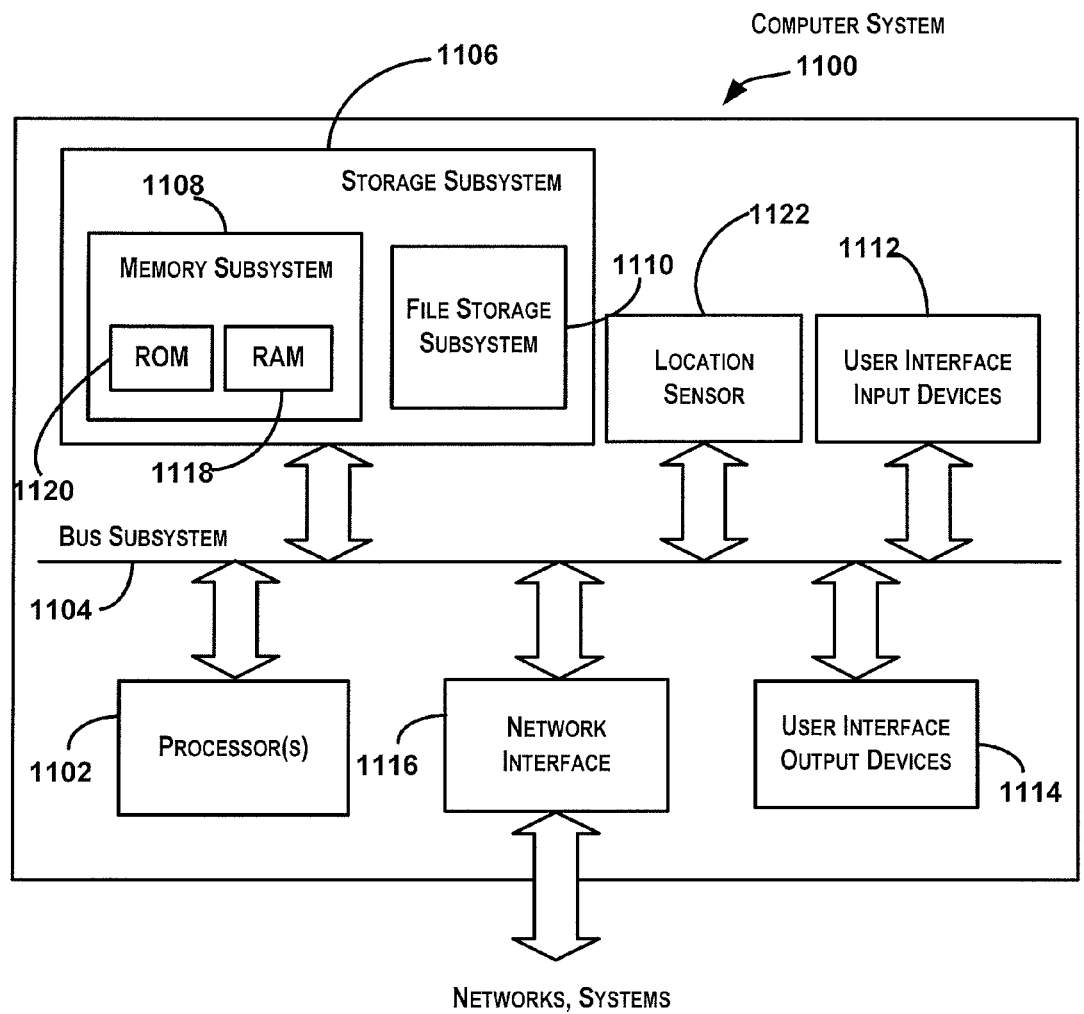
FIG. 11 is a block diagram of a computer system.

FIG. 11 is a simplified block diagram of a computer system 1100 that may be used to practice an embodiment of the present invention. In various embodiments, computer system 1100 may be used to implement any of the systems illustrated in FIG. 1 and described above. For example, computer system 1100 may be used to implement in-store server 410, server 404, and/or location service provider server 406. As shown in FIG. 11, computer system 1100 includes a processor 1102 that communicates with a number of peripheral subsystems via a bus subsystem 1104. These peripheral subsystems may include a storage subsystem 1106, comprising a memory subsystem 1108 and a file storage subsystem 1110, user interface input devices 1112, user interface output devices 1114, and a network interface subsystem 1116.

Bus subsystem 1104 provides a mechanism for enabling the various components and subsystems of computer system 1100 to communicate with each other as intended. Although bus subsystem 1104 is shown schematically as a single bus, alternative embodiments of the bus subsystem may utilize multiple busses.

Network interface subsystem 1116 provides an interface to other computer systems and networks. Network interface subsystem 1116 serves as an interface for receiving data from and transmitting data to other systems from computer system 1100. For example, network interface subsystem 1116 may enable a user computer to connect to the Internet and facilitate communications using the Internet. In some embodiments, network subsystem 1116 may be used to communicate with a user portable electronic device to determine its location and to exchange data with the user portable electronic device as described above.

Location sensor 1122 can be any device that can be used to determine location of computer system 1100, e.g., a GPS receiver.

User interface input devices 1112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 1100.

User interface output devices 1114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1100.

Storage subsystem 1106 provides a computer-readable storage medium for storing the basic programming and data constructs that provide the functionality of the present invention. Software (programs, code modules, instructions) that when executed by a processor provide the functionality of the present invention may be stored in storage subsystem 1106. These software modules or instructions may be executed by processor(s) 1102. Storage subsystem 1106 may also provide a repository for storing data used in accordance with the present invention. Storage subsystem 1106 may comprise memory subsystem 1108 and file/disk storage subsystem 1110.

Memory subsystem 1108 may include a number of memories including a main random access memory (RAM) 1118 for storage of instructions and data during program execution and a read only memory (ROM) 1120 in which fixed instructions are stored. File storage subsystem 1110 provides a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 1100 can be of various types including a personal computer, a portable computer, a workstation, a network computer, a mainframe, a kiosk, a server or any other data processing system. Due to the ever-changing nature of computers and networks, the description of computer system 1100 depicted in FIG. 11 is intended only as a specific example for purposes of illustrating the preferred embodiment of the computer system. Many other configurations having more or fewer components than the system depicted in FIG. 11 are possible.

In addition, embodiments of the present invention can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various non-transitory computer readable media for storage and/or transmission; suitable media include magnetic disk or tape, optical storage media such as compact disk (CD) or DVD (digital versatile disk), flash memory, and the like. Computer readable media encoded with the program code can be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method comprising:
   receiving, by a computer server, location information along with an accuracy value, the location information having been acquired using a global positioning service and describing an estimated location of a portable electronic device, and the accuracy value describing an accuracy range associated with the global positioning service used to acquire the location information;
   determining, based on a comparison of the accuracy value to a threshold accuracy value, whether the estimated location is sufficiently accurate for use in determining whether an actual location of the portable electronic device is within a predetermined distance of a target geographic location, wherein the estimated location is sufficiently accurate when the accuracy value is less than the threshold accuracy value; and
   in response to determining that the estimated location is sufficiently accurate, determining whether the location of the portable electronic device is within the predetermined distance of the target geographic location, by:
   determining a first length based on the accuracy value;
   defining a first area that spans the first length from the location of the portable electronic device;
   defining a second area spanning a predetermined distance from the target geographic location; and
   determining whether a portion of the first area overlaps a portion of the second area.

2. The method of claim 1, further comprising:
   in response to determining that the location of the portable electronic device is within the predetermined distance of a target geographic location:
   periodically checking whether the first area no longer overlaps the second area; and
   in response to determining that the first area no longer overlaps the second area, concluding, by the computer server, that the user has left the target geographic location.

3. The method of claim 1, further comprising increasing the first distance by a predetermined value to increase an area of overlap between the first area and the second area.

4. The method of claim 1, further comprising:
receiving, from the portable electronic device, a request for assistance with a product;
communicating, by the computer server, the request to one or more employee devices within the target geographic location;
receiving, by the computer server, information indicating that an employee will assist; and
sending, to the portable electronic device, information about the employee and a location to meet the employee.

5. The method of claim 1, further comprising:
receiving, from the portable electronic device, a request for assistance with a product;
entering the request in a queue, wherein the queue includes one or more requests for assistance with at least one product; and
sending, by the computer server, to the portable electronic device information indicative of a current position of the request in the queue.

6. The method of claim 5, further comprising sending periodic updates to the portable electronic device indicating the current position of the request in the queue.

7. The method of claim 1, further comprising:
in response to determining that the location of the portable electronic device is within the predetermined distance of the target geographic location, transmitting, to the portable electronic device, a data item associated with the target geographic location.

8. A computing system comprising:
one or more computer processors; and
a memory storing instructions that, when executed by the one or more computer processors, cause the computing system to:
receive location information along with an accuracy value, the location information having been acquired using a global positioning service and describing an estimated location of a portable electronic device, and the accuracy value describing an accuracy range associated with the global positioning service used to acquire the location information;
determine, based on a comparison of the accuracy value to a threshold accuracy value, whether the estimated location is sufficiently accurate for use in determining whether an actual location of the portable electronic device is within a predetermined distance of a target geographic location, wherein the estimated location is sufficiently accurate when the accuracy value is less than the threshold accuracy value; and
in response to determining that the estimated location is sufficiently accurate, determine whether the location of the portable electronic device is within the predetermined distance of the target geographic location, by:
determining a first length based on the accuracy value;
defining a first area that spans the first length from the location of the portable electronic device;
defining a second area spanning a predetermined distance from the target geographic location; and
determining whether a portion of the first area overlaps a portion of the second area.

9. The computing system of claim 8, wherein the instructions further cause the computing system to:
in response to determining that the location of the portable electronic device is within the predetermined distance of a target geographic location:
periodically check whether the first area no longer overlaps the second area; and
in response to determining that the first area no longer overlaps the second area, conclude that the user has left the target geographic location.

10. The computing system of claim 8, wherein the instructions further cause the computing system to:
increase the first distance by a predetermined value to increase an area of overlap between the first area and the second area.

11. The computing system of claim 8, wherein the instructions further cause the computing system to:
receive, from the portable electronic device, a request for assistance with a product;
communicate the request to one or more employee devices within the target geographic location;
receive information indicating that an employee will assist; and
send, to the portable electronic device, information about the employee and a location to meet the employee.

12. The computing system of claim 8, wherein the instructions further cause the computing system to:
receive, from the portable electronic device, a request for assistance with a product;
enter the in a queue, wherein the queue includes one or more requests for assistance with at least one product; and
send, to the portable electronic device, information indicative of a current position of the request in the queue.

13. The computing system of claim 12, wherein the instructions further cause the computing system to:
send periodic updates to the portable electronic device indicating the current position of the request in the queue.

14. The computing system of claim 8, wherein the instructions further cause the computing system to:
in response to determining that the location of the portable electronic device is within the predetermined distance of the target geographic location, transmit, to the portable electronic device, a data item associated with the target geographic location.

15. A non-transitory computer-readable medium storing instructions that, when executed by the one or more computer processors of a computing system, cause the computing system to:
receive location information along with an accuracy value, the location information having been acquired using a global positioning service and describing an estimated location of a portable electronic device, and the accuracy value describing an accuracy range associated with the global positioning service used to acquire the location information;
determine, based on a comparison of the accuracy value to a threshold accuracy value, whether the estimated location is sufficiently accurate for use in determining whether an actual location of the portable electronic device is within a predetermined distance of a target geographic location, wherein the estimated location is sufficiently accurate when the accuracy value is less than the threshold accuracy value; and
in response to determining that the estimated location is sufficiently accurate, determine whether the location of the portable electronic device is within the predetermined distance of the target geographic location, by:
determining a first length based on the accuracy value;
defining a first area that spans the first length from the location of the portable electronic device;
defining a second area spanning a predetermined distance from the target geographic location; and determining whether a portion of the first area overlaps a portion of the second area.

16. The non-transitory computer-readable medium of claim 15, wherein the instructions further cause the computing system to:
in response to determining that the location of the portable electronic device is within the predetermined distance of a target geographic location:
periodically check whether the first area no longer overlaps the second area; and
in response to determining that the first area no longer overlaps the second area, conclude that the user has left the target geographic location.

17. The non-transitory computer-readable medium of claim 15, wherein the instructions further cause the computing system to:
increase the first distance by a predetermined value to increase an area of overlap between the first area and the second area.

18. The non-transitory computer-readable medium of claim 15, wherein the instructions further cause the computing system to:
receive, from the portable electronic device, a request for assistance with a product;
communicate the request to one or more employee devices within the target geographic location;
receive information indicating that an employee will assist; and
send, to the portable electronic device, information about the employee and a location to meet the employee.

19. The non-transitory computer-readable medium of claim 15, wherein the instructions further cause the computing system to:
receive, from the portable electronic device, a request for assistance with a product;
enter the in a queue, wherein the queue includes one or more requests for assistance with at least one product; and
send, to the portable electronic device, information indicative of a current position of the request in the queue.

20. The non-transitory computer-readable medium of claim 19, wherein the instructions further cause the computing system to:
send periodic updates to the portable electronic device indicating the current position of the request in the queue.

21. The non-transitory computer-readable medium of claim 15, wherein the instructions further cause the computing system to:
in response to determining that the location of the portable electronic device is within the predetermined distance of the target geographic location, transmit, to the portable electronic device, a data item associated with the target geographic location.

* * * * *

UNITED STATES PATENT AND TRADEMARK OFFICE
CERTIFICATE OF CORRECTION

PATENT NO. : 9,294,620 B2
APPLICATION NO. : 13/476765
DATED : March 22, 2016
INVENTOR(S) : Corey Fugman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 780 days.

Signed and Sealed this
Nineteenth Day of July, 2016

Michelle K. Lee
*Director of the United States Patent and Trademark Office*